(12) United States Patent
Knox et al.

(10) Patent No.: US 9,417,075 B2
(45) Date of Patent: Aug. 16, 2016

(54) SURFACE VEHICLE VERTICAL TRAJECTORY PLANNING

(71) Applicant: Bose Corporation, Framingham, MA (US)

(72) Inventors: Lawrence D. Knox, Hopkinton, MA (US); Neal M. Lackritz, Southborough, MA (US); James A. Parison, New Ipswich, NH (US); William R. Short, Southborough, MA (US)

(73) Assignee: Bose Corporation, Framingham, MA (US)

( * ) Notice: Subject to any disclaimer, the term of this patent is extended or adjusted under 35 U.S.C. 154(b) by 4 days.

(21) Appl. No.: 14/543,002

(22) Filed: Nov. 17, 2014

(65) Prior Publication Data

US 2015/0160021 A1    Jun. 11, 2015

Related U.S. Application Data

(60) Continuation of application No. 13/922,456, filed on Jun. 20, 2013, now Pat. No. 8,948,968, which is a continuation of application No. 12/974,190, filed on Dec. 21, 2010, now Pat. No. 8,517,395, which is a division of application No. 11/670,849, filed on Feb. 2, 2007, now Pat. No. 7,878,510, which is a continuation of application No. 10/629,243, filed on Jul. 28, 2003, now Pat. No. 7,195,250, which is a continuation-in-part of application No. 10/368,187, filed on Feb. 18, 2003, now abandoned, which is a continuation-in-part of application No. 09/535,849, filed on Mar. 27, 2000, now abandoned.

(51) Int. Cl.
*B60G 17/0165* (2006.01)
*G01C 21/26* (2006.01)
*B60G 17/0195* (2006.01)

(52) U.S. Cl.
CPC ............ *G01C 21/26* (2013.01); *B60G 17/0165* (2013.01); *B60G 17/0195* (2013.01); *B60G 2400/821* (2013.01); *B60G 2400/824* (2013.01); *B60G 2401/16* (2013.01); *B60G 2500/20* (2013.01); *B60G 2600/182* (2013.01); *B60G 2600/1876* (2013.01); *B60G 2600/1877* (2013.01); *B60G 2600/1879* (2013.01); *B60G 2600/604* (2013.01); *B60G 2800/014* (2013.01); *B60G 2800/0192* (2013.01); *B60G 2800/24* (2013.01); *B60G 2800/912* (2013.01); *B60G 2800/915* (2013.01)

(58) Field of Classification Search
CPC ............... G01C 21/26; B60G 17/0165; B60G 17/0195; B60G 2800/014; B60G 2600/1877; B60G 2600/182; B60G 2600/1879; B60G 2600/604; B60G 2800/0192; B60G 2600/1876; B60G 2800/915; B60G 2800/912; B60G 2500/20; B60G 2400/821; B60G 2800/24; B60G 2401/16; B60G 2400/824
See application file for complete search history.

(56) References Cited

U.S. PATENT DOCUMENTS

| 4,970,652 | A | * | 11/1990 | Nagashima | ............ | G01C 21/30 340/995.25 |
| 5,119,301 | A | * | 6/1992 | Shimizu | .................. | G01S 19/49 340/995.25 |

(Continued)

*Primary Examiner* — Ruth Ilan
*Assistant Examiner* — Timothy Wilhelm
(74) *Attorney, Agent, or Firm* — Fish & Richardson P.C.

(57) ABSTRACT

An active suspension system for a vehicle including elements for developing and executing a trajectory plan responsive to the path on which the vehicle is traveling. The system may include a location system for locating the vehicle, and a system for retrieving a road profile corresponding to the vehicle location.

8 Claims, 15 Drawing Sheets

(56) References Cited

U.S. PATENT DOCUMENTS

| | | | | |
|---|---|---|---|---|
| 5,311,173 A * | 5/1994 | Komura | ............... | G01C 21/30 340/988 |
| 5,552,990 A * | 9/1996 | Ihara | ............... | G01C 21/30 340/988 |
| 5,699,056 A * | 12/1997 | Yoshida | ............... | G01C 21/26 340/905 |
| 5,774,851 A * | 6/1998 | Miyashiba | ............... | G10L 25/87 704/247 |
| 5,899,288 A * | 5/1999 | Schubert | ............... | F16F 15/027 180/89.12 |
| 6,000,703 A * | 12/1999 | Schubert | ............... | B60G 17/0165 180/89.12 |
| 7,195,250 B2 * | 3/2007 | Knox | ............... | B60G 17/0165 280/5.515 |
| 7,878,510 B2 * | 2/2011 | Knox | ............... | B60G 17/0165 180/167 |
| 8,517,395 B2 * | 8/2013 | Knox | ............... | B60G 17/0165 280/5.5 |

\* cited by examiner

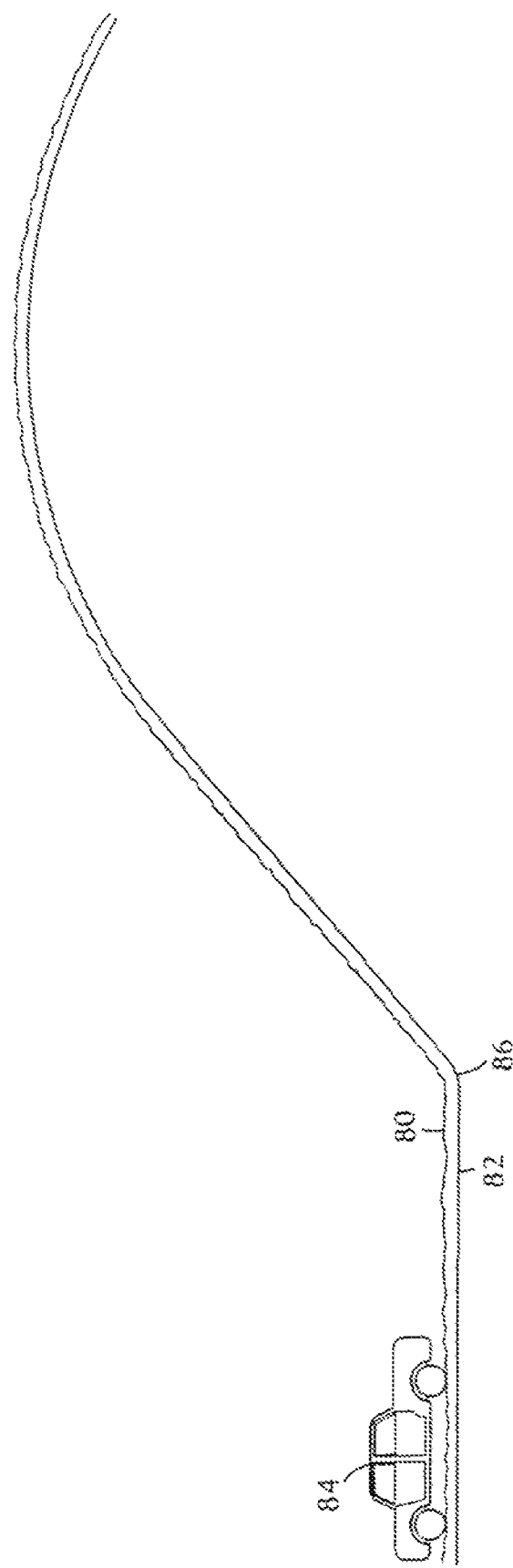

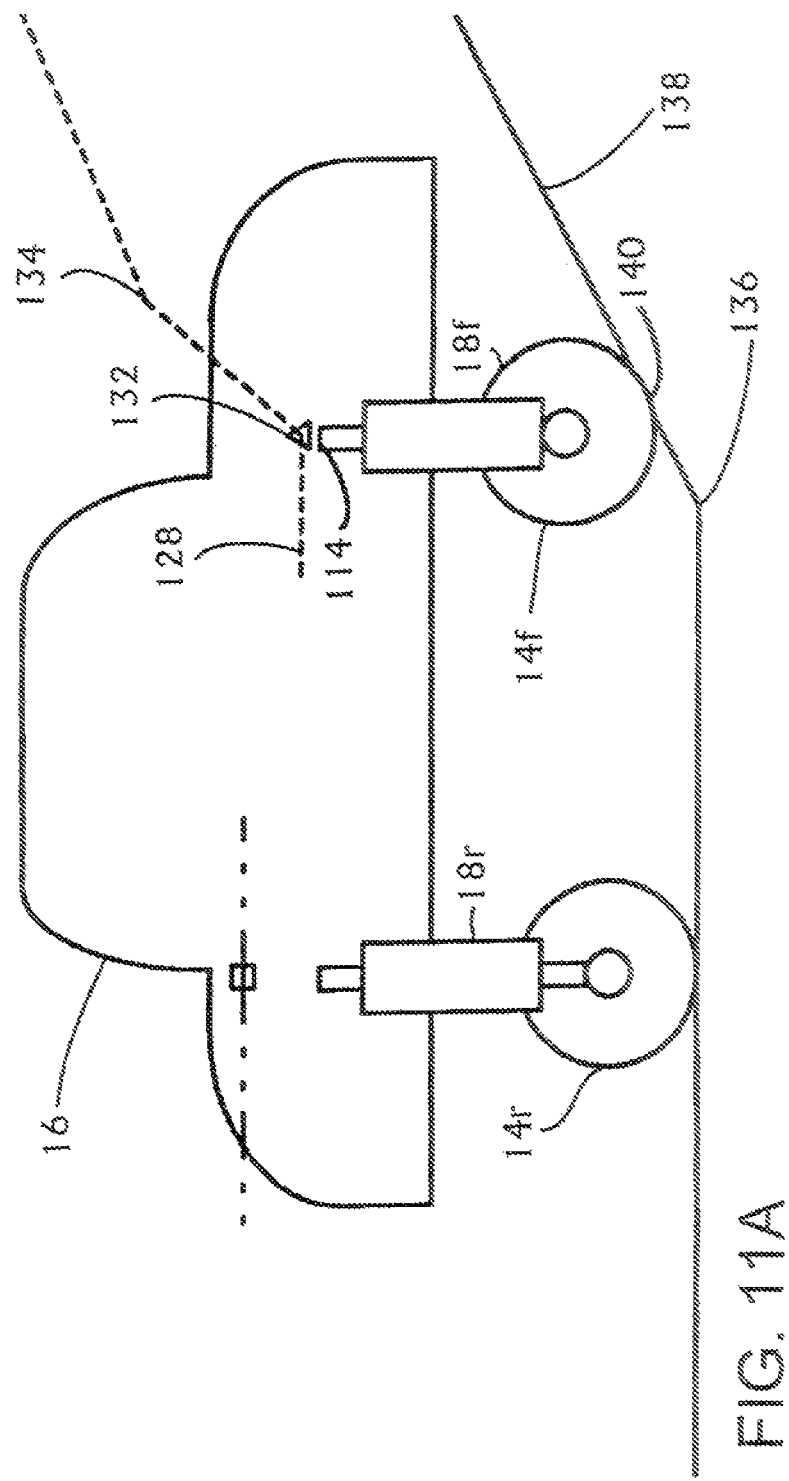

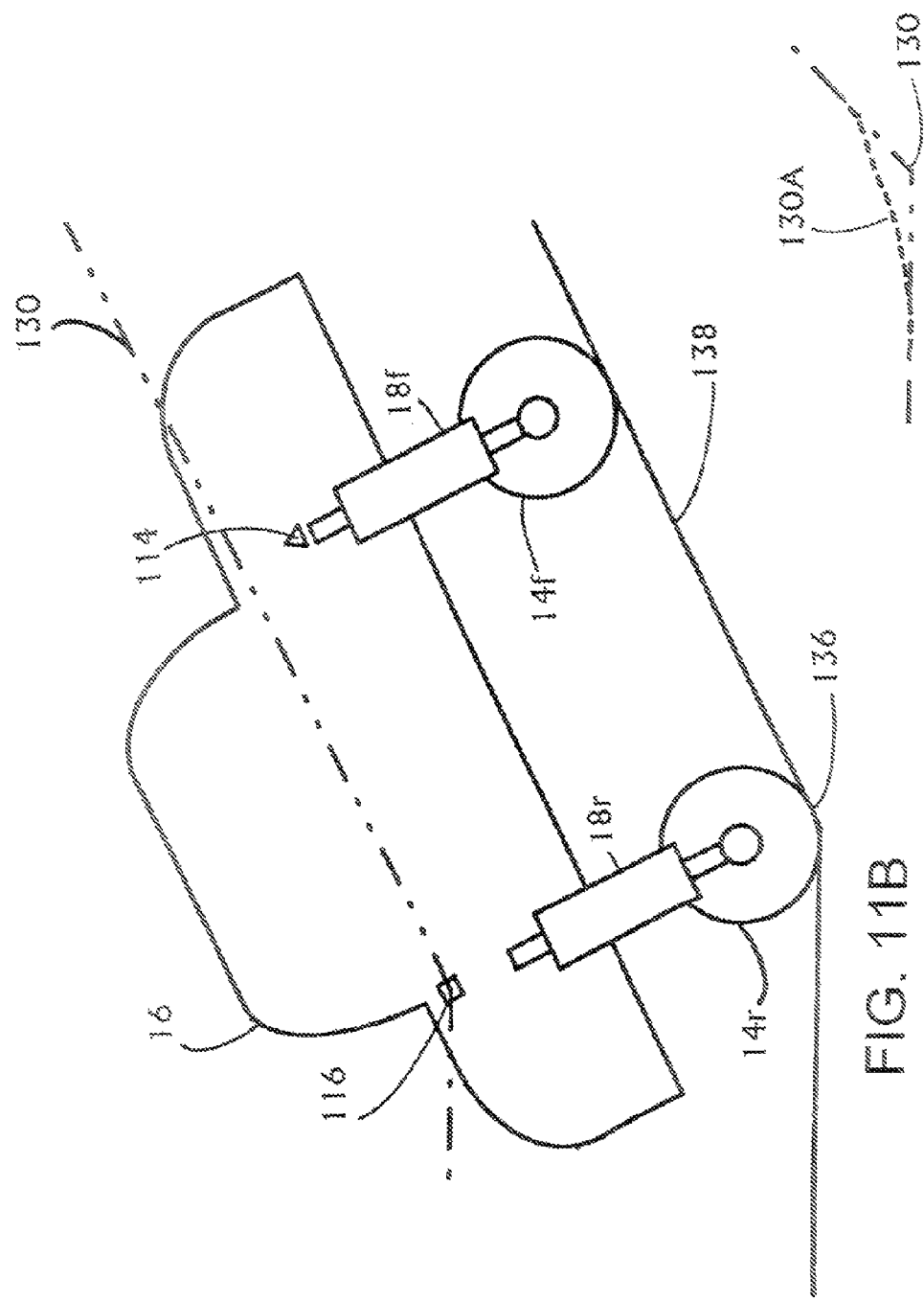

US 9,417,075 B2

SURFACE VEHICLE VERTICAL TRAJECTORY PLANNING

CLAIM OF PRIORITY

This application is a continuation of U.S. patent application Ser. No. 13/922,456, filed on Jun. 20, 2013, which is a continuation of U.S. patent application Ser. No. 12/974,190, filed on Dec. 21, 2010, which a divisional of U.S. patent application Ser. No. 11/670,849, now U.S. Pat. No. 7,878, 510, filed on Feb. 2, 2007, which is a continuation and claims priority under 35 USC §120 to U.S. patent application Ser. No. 10/629,243, now U.S. Pat. No. 7,195,250, filed on Jul. 28, 2003, which is a continuation-in-part of U.S. patent application Ser. No. 10/368,187, filed on Feb. 18, 2003, now abandoned, which is a continuation-in-part of U.S. patent application Ser. No. 09/535,849, filed on Mar. 27, 2000, now abandoned, and the entire contents of which are hereby incorporated by reference.

BACKGROUND OF THE INVENTION

The invention relates to active vehicle suspensions, and more particularly to active vehicle suspension systems including vertical trajectory planning systems.

SUMMARY OF THE INVENTION

It is an important object of the invention to provide an improved active vehicle suspension.

According to one aspect of the invention, a vehicle suspension system for a surface vehicle having a payload compartment and a surface engaging device includes a controllable suspension element for applying a force between the payload compartment and the surface engaging device, and a profile storage device, for storing a plurality of profiles of paths. The profiles include vertical deflection data. The system further includes a profile retrieving microprocessor, coupled to the controllable suspension element and to the profile storage device, for retrieving from the profile storage device one of the profiles, the one profile corresponding to the path on which the vehicle is traveling.

In another aspect of the invention, in a vehicle for operating on a path, the vehicle having a payload compartment and a surface engaging device, an active vehicle suspension includes a force applying element coupling the payload compartment and the surface engaging device, for applying a force between the payload compartment and the surface engaging device to vary the vertical position of the payload compartment relative to the surface engaging device, a profile storage device for storing a vertical profile of the path, and a trajectory plan development subsystem, communicatingly coupled to the force applying element and to the profile storage device, for developing a trajectory plan responsive to the stored profile and for issuing commands to the force applying element, the commands corresponding to the trajectory plan.

In another aspect of the invention, a method for operating an active vehicle suspension system in a surface vehicle having a data storage device includes the steps of: determining the location of the surface vehicle; determining if there is stored in the surface vehicle a vertical trajectory plan corresponding to the location; responsive to a determination that there is stored in the vehicle suspension system the vertical trajectory plan, retrieving the plan; executing the plan.

In another aspect of the invention, a method for operating an active vehicle suspension in a surface vehicle having a sensing device to sense the vertical profile of a path and a data storage device, includes the steps of sensing a vertical profile of a path; recording the profile; and comparing the recorded profile with profiles stored in a database to find if the sensed profile matches one of the stored profiles.

In another aspect of the invention, an active suspension system for a surface vehicle for operating on a path, includes an active suspension; a profile sensor for sensing a profile of the path; a path profile storage device for storing a database of path profiles; and a path profile microprocessor, coupled to the storage device and to the profile sensor, for comparing the sensed profile with the database of profiles.

In another aspect of the invention, an active suspension system for a surface vehicle includes an active suspension; a locator system for determining the location of the surface vehicle; a trajectory plan storage device, for storing a database of trajectory plans corresponding to locations; and a trajectory plan microprocessor for determining if the database contains a trajectory plan corresponding to the determined location, for retrieving the corresponding trajectory plan, and for transmitting to the active suspension instructions, based on the corresponding trajectory plan.

In another aspect of the invention, a method for determining the location of a surface vehicle includes storing a plurality of profiles of paths, the path profiles associated with locations and containing only vertical deflections of the path, measured at increments; sensing vertical deflection of a path on which the vehicle is currently traveling; and comparing the sensed vertical deflections with the path profiles.

In another aspect of the invention, a method for developing a trajectory plan for use with a vehicle that includes a vehicle suspension system that includes a trajectory planning system for developing a trajectory plan, a controllable suspension element for urging a point on the vehicle to follow the trajectory plan includes recording a profile that includes data points, the data points representing positive and negative vertical deflections of a travel path; smoothing data of the profile, the smoothing providing positive and negative values; and recording the smoothed data as the trajectory plan.

In another aspect of the invention, a method for developing a trajectory plan for use with an active vehicle suspension includes operating the vehicle on a section of road; recording data points representative of a profile of the section of road; and smoothing the data to provide the trajectory plan. The smoothing preserves positive and negative values of the data points.

In another aspect of the invention, a method for operating a vehicle that includes a controllable suspension element, a microprocessor, and sensors for measuring at least one of vertical deflection, force applied by the controllable suspension, vertical velocity, and vertical acceleration, includes storing a library of a plurality of profiles; driving the vehicle over a road section and recording data measured by the sensors to provide measured data; and comparing the measured data with the plurality of profiles to determine a degree of match.

In another aspect of the invention, a method for developing an optimized trajectory plan for a vehicle that includes a controllable suspension element includes a first developing, by a microprocessor, using a first characteristic value, of a first trajectory plan corresponding to a profile; a first executing, of the first trajectory plan, the first executing including recording performance data corresponding to the first trajectory plan; a first modifying, of the first characteristic value to provide a second characteristic value; a second developing, using the second characteristic value, by the microprocessor, of a second trajectory plan corresponding to the profile; a second executing, of the second trajectory plan, the second executing including recording a measure of performance data corresponding to the second trajectory plan; a first comparing of the performance data corresponding to the executing of the first trajectory plan and the performance data corresponding to the executing of the second trajectory plan to determine better performance data; and a first storing, as a current characteristic value, of a one of the first characteristic value and the second characteristic value corresponding to the better performance data.

In another aspect of the invention, a method for developing a trajectory plan for use by a vehicle including a payload compartment, a wheel, a plurality of sensors for measuring a corresponding plurality of states of the vehicle, and a controllable suspension element for exerting force between the wheel and the payload compartment, includes recording a profile includes data points measured by the sensors, the data points representing positive and negative vertical values; storing the profile as one of a series of commands causing the controllable suspension element to exert a force, and a series of states of the vehicle as measured by at least one of the sensors.

In another aspect of the invention, an active vehicle suspension for a surface vehicle including a payload compartment and a surface engaging device, the vehicle for operating along a path, includes a controllable suspension element for modifying the displacement between the payload compartment and the surface engaging device responsive to vertical displacements in the path; and a trajectory developing subsystem for issuing commands to the controllable suspension element causing the controllable suspension element to exert a force to modify the displacement between the payload compartment and the surface engaging device prior to the surface engaging device encountering the vertical displacement.

In another aspect of the invention, a method for operating a vehicle including a payload compartment and a front surface engaging device and a rear surface engaging device, the vehicle further including a suspension system, the suspension system including a front controllable suspension element for exerting a force between the front surface engaging device and the payload compartment to modify the distance between the front surface engaging device and the payload compartment, the front controllable suspension element having a centered position, the front controllable suspension element including a centering subsystem for urging the front controllable suspension element toward the centered position, the suspension system further including a rear controllable suspension element for exerting a force between the rear surface engaging device and the payload compartment to modify the distance between the rear surface engaging device and the payload compartment, the rear controllable suspension element having a centered position, the rear controllable suspension element including a controllable centering subsystem for urging the rear controllable suspension element toward the centered position, includes operating the vehicle on a road segment including disturbances so that the front surface engaging device encounters the disturbances before the rear surface engaging device and so that the front controllable suspension element exerts forces responsive to the disturbances; determining the amplitude of one of the road disturbances, responsive to a determining that the amplitude of the one of the disturbances is less than a first threshold amount, disabling the rear suspension element centering subsystem.

In another aspect of the invention, a surface vehicle includes a payload compartment; a front surface engaging device; a rear surface engaging device; and a suspension system including a front controllable suspension element for exerting a force between the front surface engaging device and the payload compartment to modify the distance between the front surface engaging device and the payload compartment, the front controllable suspension element having a centered position, the front controllable suspension element including a centering subsystem for urging the front controllable suspension element toward the centered position, the front controllable suspension element further includes a measuring system to measure the amplitude of a road disturbance encountered by the front surface engaging device; and a rear controllable suspension element for exerting a force between the rear surface engaging device and the payload compartment to modify the distance between the rear surface engaging device and the payload compartment, the rear controllable suspension element having a centered position, the rear controllable suspension element including a controllable centering subsystem for urging the rear controllable suspension element toward the centered position; and controlling circuitry, responsive to the measuring system, for disabling the rear suspension element centering subsystem.

In another aspect of the invention, a method for operating a vehicle including a payload compartment and a first surface engaging device and a second surface engaging device, the vehicle further including a suspension system, the suspension system including a first controllable suspension element for exerting a force between the first surface engaging device and the payload compartment to modify the distance between the first surface engaging device and the payload compartment, the suspension system further including a second controllable suspension element for exerting a force between the second surface engaging device and the payload compartment to modify the distance between the second surface engaging device and the payload compartment, each of the first controllable suspension element and the second suspension element including associated sensors to measure at least one of vertical acceleration, vertical velocity, vertical road deflection, suspension displacement, and force applied by the controllable suspension includes operating the vehicle on a road segment having disturbances so that the first surface engaging device encounters the disturbances before the second surface engaging device; measuring, by the sensors associated with the first controllable suspension element, the disturbances; based on the measuring, causing the second controllable suspension element to exert a force related to the disturbance before the second surface engaging device encounters the disturbance.

In another aspect of the invention, a method for operating a vehicle including a payload compartment and a first surface engaging device and a second surface engaging device, the vehicle further including a suspension system, the suspension system including a first controllable suspension element for exerting a force between the first surface engaging device and the payload compartment to modify the distance between the first surface engaging device and the payload compartment, the suspension system further including a second controllable suspension element for exerting a force between the second surface engaging device and the payload compartment to modify the distance between the second surface engaging device and the payload compartment, each of the first controllable suspension element and the second suspension element includes associated sensors to measure at least one of vertical acceleration, vertical velocity, vertical road deflection, suspension displacement, and force applied by the controllable suspension, the method includes operating the vehicle on a road segment having disturbances so that the first surface engaging device encounters the disturbances before the second surface engaging device; measuring, by the sensors associated with the first controllable suspension element, the disturbances; and based on the measuring, causing the second controllable suspension element to exert a force related to the disturbance before the second surface engaging device encounters the disturbance.

In still another aspect of the invention, a method for operating a vehicle including a payload compartment and a surface engaging device the vehicle further including a suspension system, the suspension system including a controllable suspension element for exerting a force between a surface engaging device and the payload compartment to modify the distance between the surface engaging device and the payload compartment, the surface controllable suspension element having a centered position, the controllable suspension element including a reactionary operating mode and a trajectory plan operating mode, the method includes driving the vehicle on a road segment having vertical disturbances; determining the amplitude of the disturbances; responsive to a determining that an amplitude of a one of the disturbances is less than a first threshold amount, operating the controllable suspension element in the reactionary mode; responsive to a determining that the amplitude of the one of the disturbances is greater than the first threshold amount and less than a second threshold amount, disabling the centering system; and responsive to a determining that the amplitude of the one of the disturbances is greater than the second threshold amount, causing the controllable suspension to exert a force related to the one of the disturbances before the surface engaging device encounters the disturbance.

Other features, objects, and advantages will become apparent from the following detailed description, which refers to the following drawings in which:

BRIEF DESCRIPTION OF THE SEVERAL VIEWS OF THE DRAWING

FIG. 7 is a diagrammatic view illustrating a method of trajectory plan development;

FIGS. 11A-11C are diagrams of a vehicle operating on a road surface in accordance with the invention.

DETAILED DESCRIPTION

Figure 1:
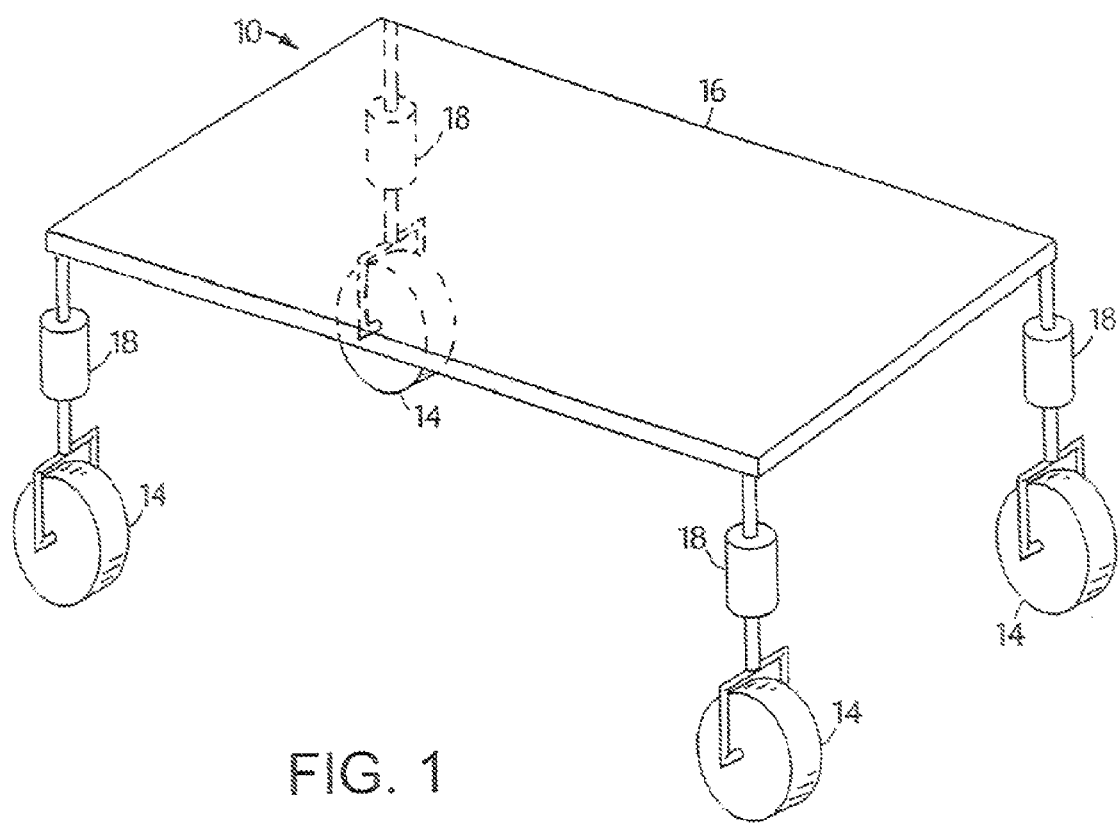
FIG. 1 is a diagrammatic view of a vehicle having a controllable suspension.

With reference now to the drawings and more particularly to FIG. 1, there is shown a diagrammatic view of a vehicle 10 according to the invention. A suspension system includes surface engaging devices, such as wheels 14 connected to payload compartment 16 (represented diagrammatically as a plane) of the vehicle by a controllable suspension element 18. In addition, the suspension system may include conventional suspension elements (not shown), such as a coil or leaf spring arrangement or damper. While one embodiment of the invention is an automobile, so that the surface engaging devices are wheels and the payload includes passengers, the invention may also be practiced in other types of vehicles, such as cargo carrying vehicles. Payload compartment 16 may be a planar structure or may be enclosed on some or all sides. The surface engaging devices may include tracks or runners. The invention may also be practiced in vehicles that engage the surface through some form of levitation, such as magnetic or pneumatic levitation, so that the surface engaging devices include devices that do not require physical contact with the surface, and so that the surface may include tracks or open terrain. For simplicity of explanation, the invention will be described as embodied in an automobile.

Controllable suspension elements 18 may be one of a variety of suspension elements that receive, or are capable of being adapted to receive, control signals from a microprocessor and to respond to the signals.

Figure 2A:
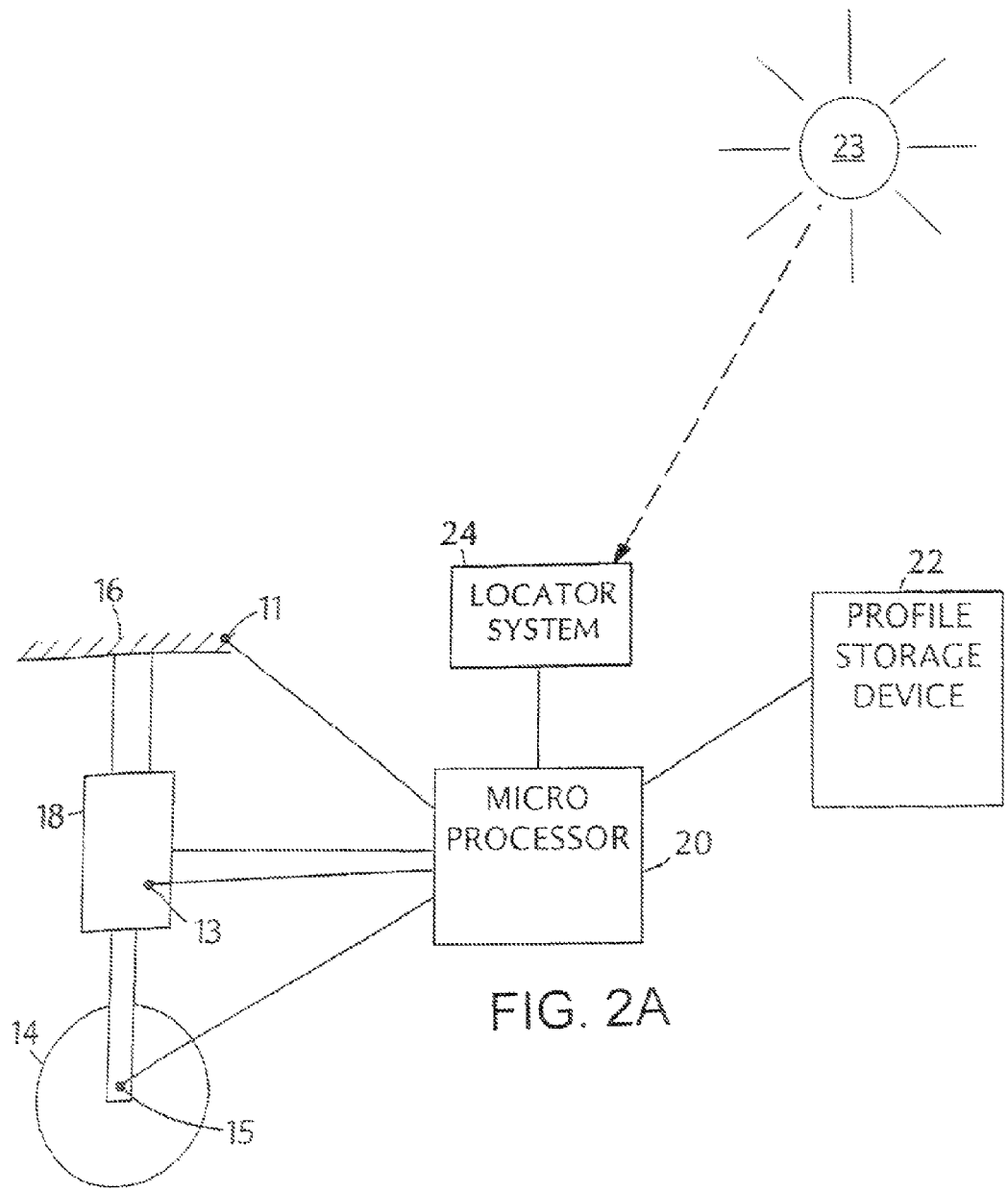
FIG. 2a is a partially block diagram, partially diagrammatic representation of a controllable suspension according to the invention.

Controllable suspension elements 18 may be components of a conventional active suspension system, in which the controllable suspension elements can respond to the control signals by varying the vertical displacement between the passenger compartment 16 and wheel 14 by applying a force. Suitable active suspension systems are described in U.S. Pat. Nos. 4,960,290 and 4,981,309 incorporated by reference herein. The force may be transmitted through some element such as a linear or rotary actuator, ball screw, pneumatic system, or hydraulic system, and may include intervening elements between the wheel and the force producing element. The controllable active suspension may also comprise an adaptive active vehicle suspension such as described in U.S. Pat. No. 5,432,700, in which signals may be used to modify adaptive parameters and gains. Controllable suspension elements 18 may also be components of a conventional suspension system, which apply forces between passenger compartment 16 and wheel 14 reactively, in response to vertical forces resulting from wheel 14 passing over uneven surfaces. In conventional suspension systems, the controllable suspension elements may respond to the control signals by extending or compressing a spring, by changing a damping rate, or in other ways. By way of example, the invention will be described in an embodiment in which the controllable suspension element is an active suspension element. Referring now to FIG. 2a, there is shown a block diagram of a suspension according to the invention. Controllable suspension element 18 is coupled to a microprocessor 20 which is in turn coupled to profile storage device 22 and optional locator system 24. The suspension system further includes sensors 11, 13, and 15 associated with payload compartment 16, controllable suspension elements 18, and wheels 14, respectively. Sensors, 11, 13, and 15 are coupled to microprocessor 20. Locator system 24 may receive signals from an external source, such as a positioning satellite 23. For convenience, only one of the controllable suspension elements 18 is shown. The remaining wheels 14, controllable suspension elements 18, and the respective sensors 11, 13, and 15 are coupled to microprocessor 20 substantially as shown in FIG. 2a.

Microprocessor 20 may be a single microprocessor as shown. Alternatively, the functions performed by microprocessor 20 may be performed by a number of microprocessors or equivalent devices, some of which can be located remotely from vehicle 10, and may wirelessly communicate with components of the suspension system, which are located on vehicle 10.

Profile storage device 22 may be any one of a number of types of writable memory storage, such as RAM, or mass storage devices such as a magnetic or writable optical disk. Profile storage device 22 may be included in the vehicle as shown, or may be at some remote location, with a broadcasting system for wirelessly communicating path profile data to the vehicle. Locator system 24 may be one of a number of systems for providing longitudinal and latitudinal position, such as the Global Positioning System (GPS) or an inertial navigation system (INS). Locator system 24 may include systems, which provide for user input to indicate location and may also include profile matching systems that compare the profile of the path being driven by the vehicle with the profiles stored in memory storage.

In one embodiment, the path being driven on is a roadway. However, the invention may be used in other types of vehicles that do not operate on roadways, such as open terrain vehicles and vehicles that operate on rails. The path can be typically defined by a location and a direction. By way of example, the invention will be described as embodied in an automobile for operating on a roadway.

A suspension system incorporating the invention may also include a trajectory planning subsystem, which includes (referring to FIG. 2a) microprocessor 20, profile storage device 22, and locator system 24.

Locator system 24 detects the location of the vehicle, and microprocessor 20 retrieves a copy of the profile of the road, if available, from a plurality of profiles stored in profile storage device 22. Microprocessor 20 calculates or retrieves a trajectory plan responsive to the road profile, and issues control signals to controllable suspension element 18 to execute the trajectory plan. The profile retrieval, trajectory calculation, and suspension control may be performed by a single microprocessor as shown, or may be done by separate microprocessors if desired. The trajectory plan development process is described more fully in connection with FIGS. 6a and 6b. If controllable suspension element 18 is an active suspension acting reactively to road forces, microprocessor 20 may issue an adjusted control signal to controllable suspension element 18 based in part on the road profile.

In a typical form, a road profile includes a series of vertical (z-axis) deflections from a reference point. The z-axis deflection measurements are typically taken at uniform distances from the location taken in the direction of travel. A road profile can also contain additional data such as x-axis and y-axis deflection; compass heading; steering angle; or other information such as may be included in navigation systems, such as commercially available vehicle navigation products. The additional data may involve greater processing capability of microprocessor 20 and profile storage device 22, but may be advantageous in using "dead reckoning" or pattern matching techniques described below to more precisely locate the vehicle or in uniquely associating a road profile with a location. Additionally, the additional data may be advantageous in determining, for example, the degree to which traction should be considered in developing the trajectory.

A trajectory plan is a pre-determined path in space of a point or set of points on the payload compartment. To control the pitch of the vehicle, the trajectory may represent at least two points, respectively forward and rearward in the payload compartment. To control the roll of the vehicle, the trajectory plan may represent at least two points, one on each side of the vehicle. In a four wheeled vehicle, it may be convenient to use for trajectory plan development four points in the payload compartment, one near each wheel. Pairs of the points could be averaged (such as averaging the two points on each side of the vehicle to consider roll in the development of the trajectory plan, or averaging the two points in the front and the rear, respectively, to consider pitch in the development of the trajectory plan). For simplicity of explanation, the invention will be described in terms of a single point. The microprocessor issues control signals to controllable suspension element 18 to cause the vehicle to follow the trajectory plan. More detail on trajectory plans and the execution of trajectory plans are set forth in the examples that follow.

The trajectory plan may take a number of factors into account, for example matching the pitch or roll of the vehicle to the pitch or roll expected by the passengers; minimizing the vertical acceleration of the payload compartment; maximizing the stroke of the suspension available to absorb bumps or dips, (hereinafter "disturbances") in the road; minimizing the amplitude or occurrence of accelerations of an undesirable frequency, such as frequencies around 0.1 Hz, which tends to induce nausea; maximizing tire fraction; or others. The trajectory plan may also include "anticipating" a disturbance in the road and reacting to it before it is encountered, as will be described below in the discussion of FIG. 5. Further, particularly if the suspension system includes a conventional spring to support the weight of the car and the operation of the active suspension element extends or compresses the conventional spring, the trajectory plan may take power consumption into account.

Figure 2B:
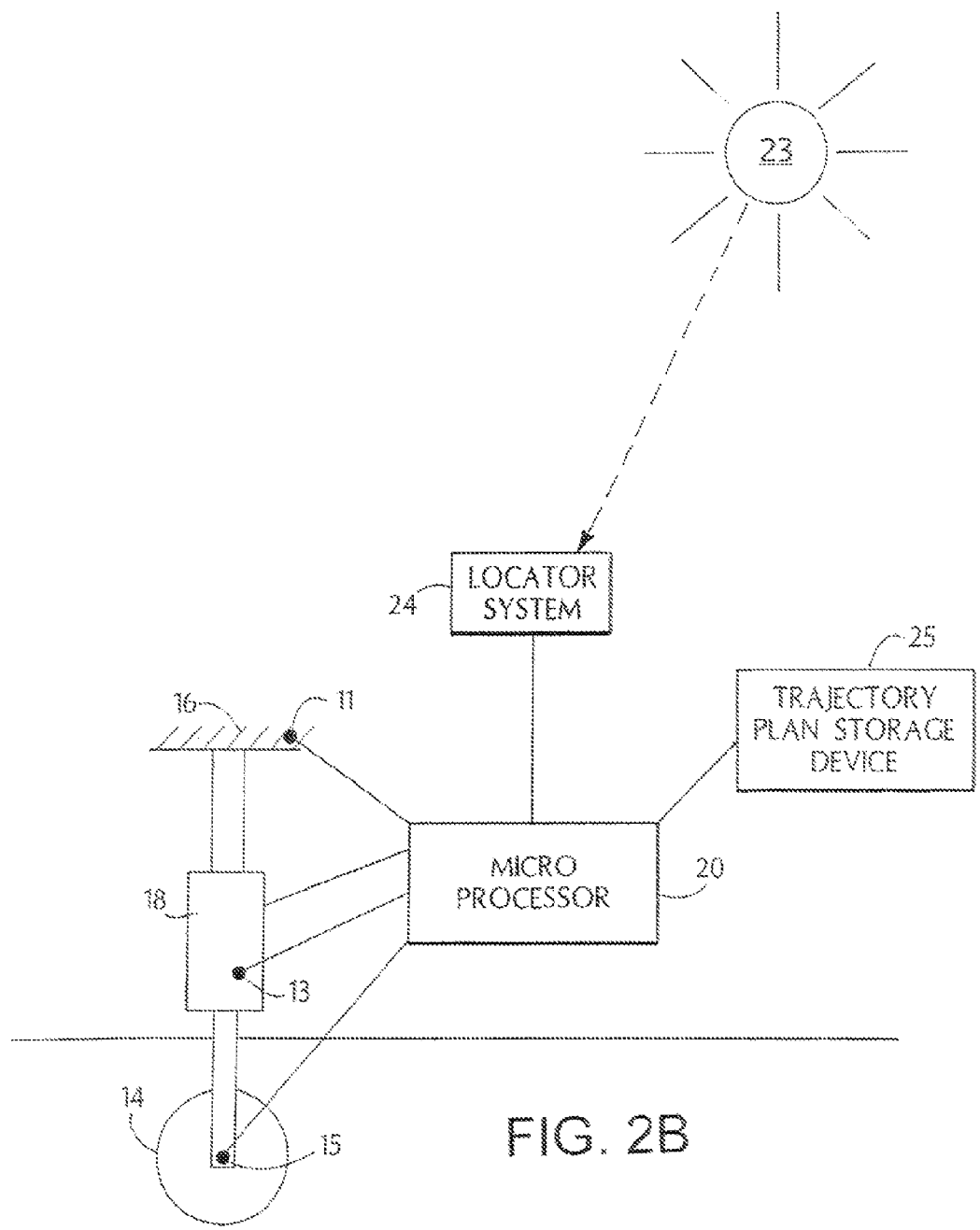
FIG. 2b is a partially block diagram, partially diagrammatic representation of a controllable suspension according to the invention.

Referring now to FIG. 2b, there is shown another embodiment of the invention incorporating a trajectory plan storage device 25. Elements of FIG. 2b are similar to elements of FIG. 2a, except profile device 22 of FIG. 2a is replaced by a trajectory plan storage device 25. Trajectory plan storage device 25 may be any one of a number of types of writable memory storage, such as RAM, or mass storage devices such as a magnetic or writable optical disk. Trajectory plan storage device 25 may be included in the vehicle as shown, or may be at some remote location, with a broadcasting system for wirelessly communicating path profile data to the vehicle.

Operation of the embodiment of FIG. 2b is similar to the operation of the embodiment of FIG. 2a, except that microprocessor 20 retrieves and calculates trajectory plans that are associated with locations rather than being associated with profiles.

Another embodiment of the invention includes both the profile storage device of FIG. 2a and the trajectory plan storage device of FIG. 2b. In an embodiment including both profile storage device 22 and trajectory plan storage device 25, the storage devices may be separate devices or may be different portions of a single memory device. Operation of embodiments including trajectory plan storage device 25 are described further in the discussion of FIG. 6c.

Figure 3:
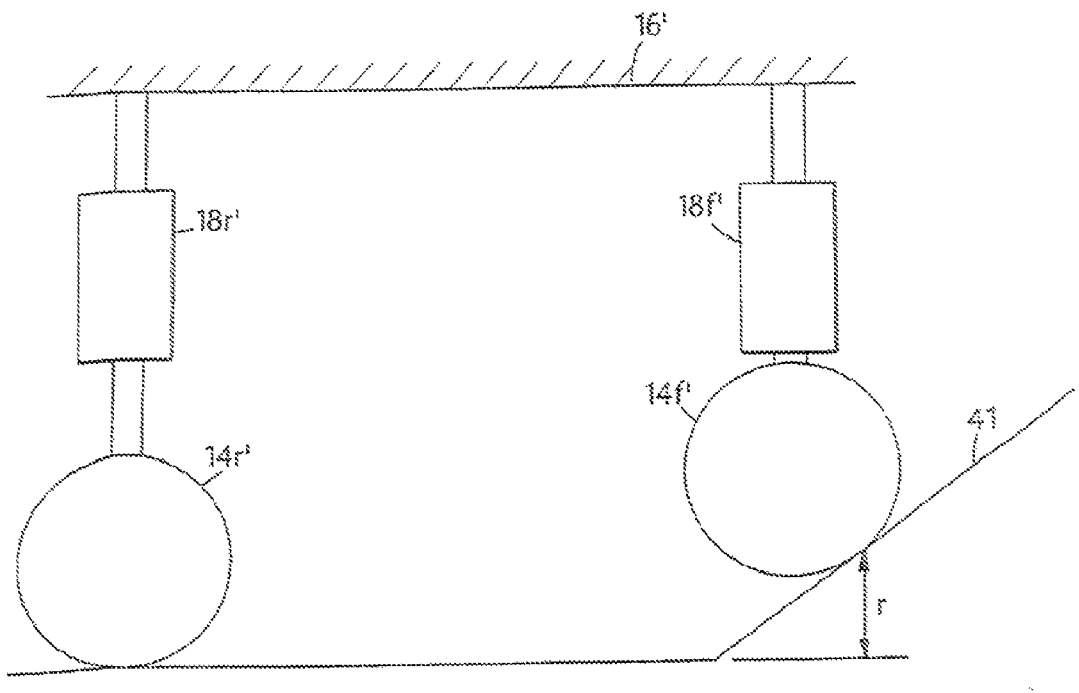
FIG. 3 is a diagrammatic view of the operation of a prior art active suspension.

FIG. 3 shows an example of the operation of a conventional active suspension without a trajectory planning subsystem. In FIG. 3, when front wheel 14f encounters sloped section 41, controllable suspension element 18f exerts a force to shorten the distance between payload compartment 16' and front wheel 14f. When the rise r due to the slope approaches the maximum lower displacement of the suspension element, suspension element 14f is "nosed in" to slope 41, and in extreme cases may reach or approach a "bottomed out" condition, such that there is little or no suspension travel left to accommodate bumps in the rising surface.

Many suspension systems have centering subsystems to retain available suspension travel and to prevent the suspension element from bottoming out or topping out. Centering subsystems urge the suspension toward a centered position if the suspension approaches a bottomed out or topped out position. Spring systems inherently have a centering system, because the force exerted by a spring is proportional to the extension or compression of the spring. A "centered" position is typically the condition of the suspension when there is no upward or downward force, other than the weight of the vehicle, on the suspension. The centered position is not necessarily a position at which there is equal suspension available for upward and downward disturbances.

Figure 4A:
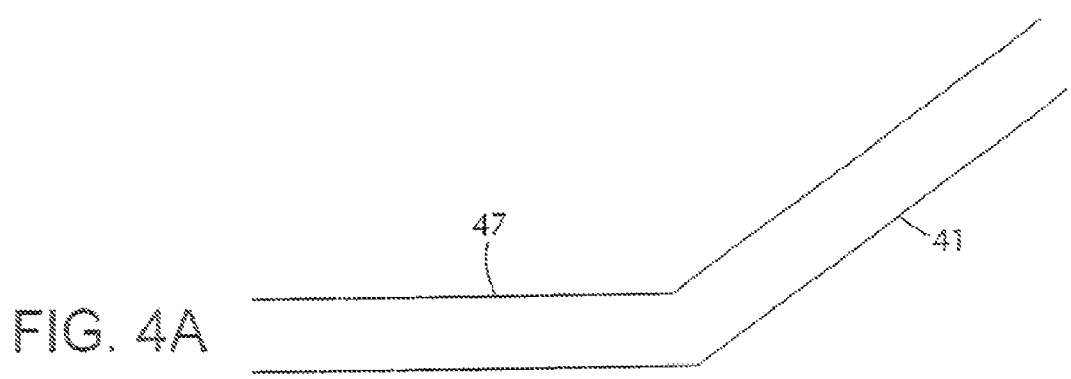
FIGS. 4a-4c are diagrammatic views of the operation of an active suspension according to the invention.
Figure 4B:
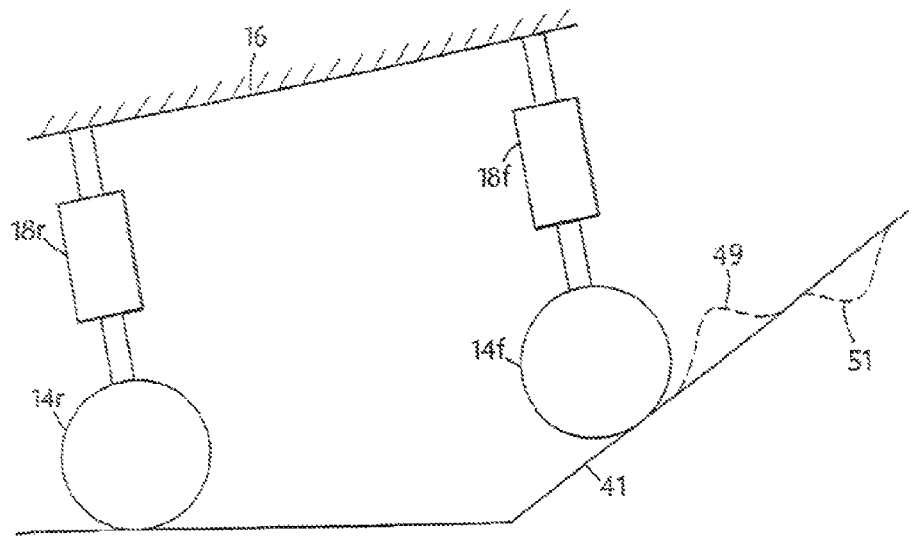
Figure 4C:
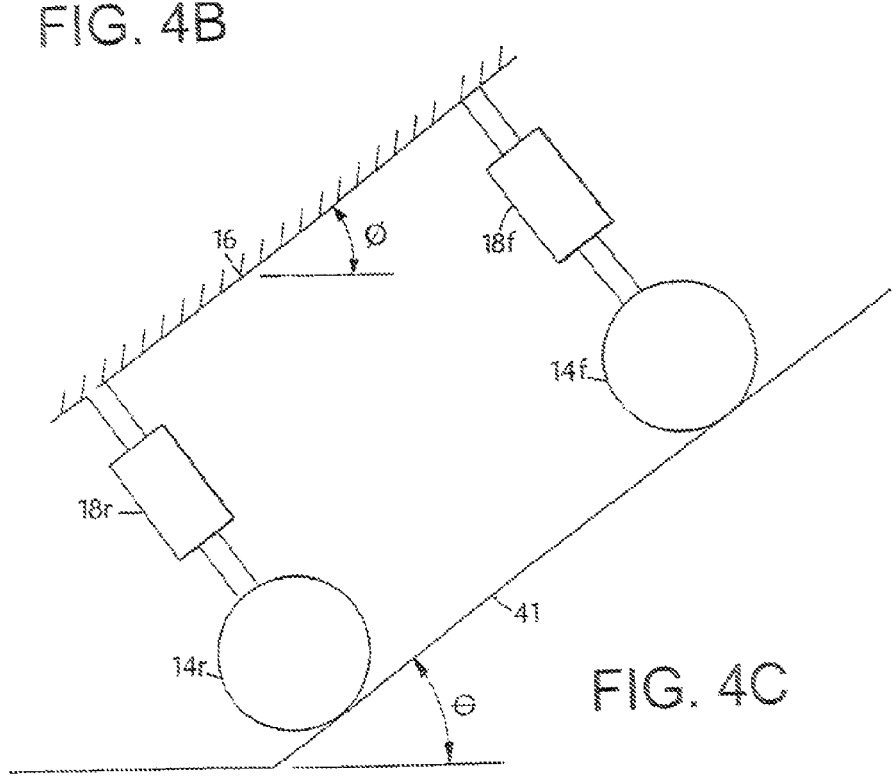

Referring now to FIGS. 4a-4c, there is shown an example of the operation of an active suspension according to the invention. Microprocessor 20 of FIG. 2a furnishes a computed trajectory plan 47, which closely matches the road surface, including sloped section 41, and issues appropriate control signals to controllable suspension elements 18f and 18r to follow the trajectory plan. In this example, the trajectory plan can be followed by exerting no force to shorten or lengthen the distance between wheels 14f and 14r and payload compartment 16, or if the suspension system includes a conventional spring, the trajectory plan can be followed by exerting only enough force to counteract acceleration resulting from force exerted by the spring. In FIG. 4b, when the vehicle has reached the same position in the road as in FIG. 3, payload compartment 16 is tilted slightly. In FIG. 4c, the payload compartment is tilted at an angle $\phi$ which matches the tilt $\theta$ of the road. The gradual tilt of the payload compartment to match the tilt of the road matches rider expectations. An additional advantage is that if there is a disturbance, such as a bump 49 or depression 51 in the road, the full stroke of the suspension is available to absorb the disturbance.

The example of FIGS. 4a-4c illustrates the principle that following the trajectory plan may occur with little or no net force being applied by the controllable suspension element 18 and that execution of the trajectory planning subsystem may affect the normal operation of an active suspension. In FIGS. 4b and 4c, the vehicle is experiencing upward acceleration, and the normal reactionary operation of the active suspension would shorten the distance between wheel 14f and the payload compartment 16 as shown in FIG. 3. With a suspension according to the invention, operating with a trajectory plan, the active suspension could remain in a centered position, so that the vehicle payload compartment follows trajectory plan 47. Alternatively, the operational example of FIGS. 4b-4c could be combined with the operational example of FIG. 5 below so that the vehicle payload compartment follows trajectory plan 47a.

Figure 5:
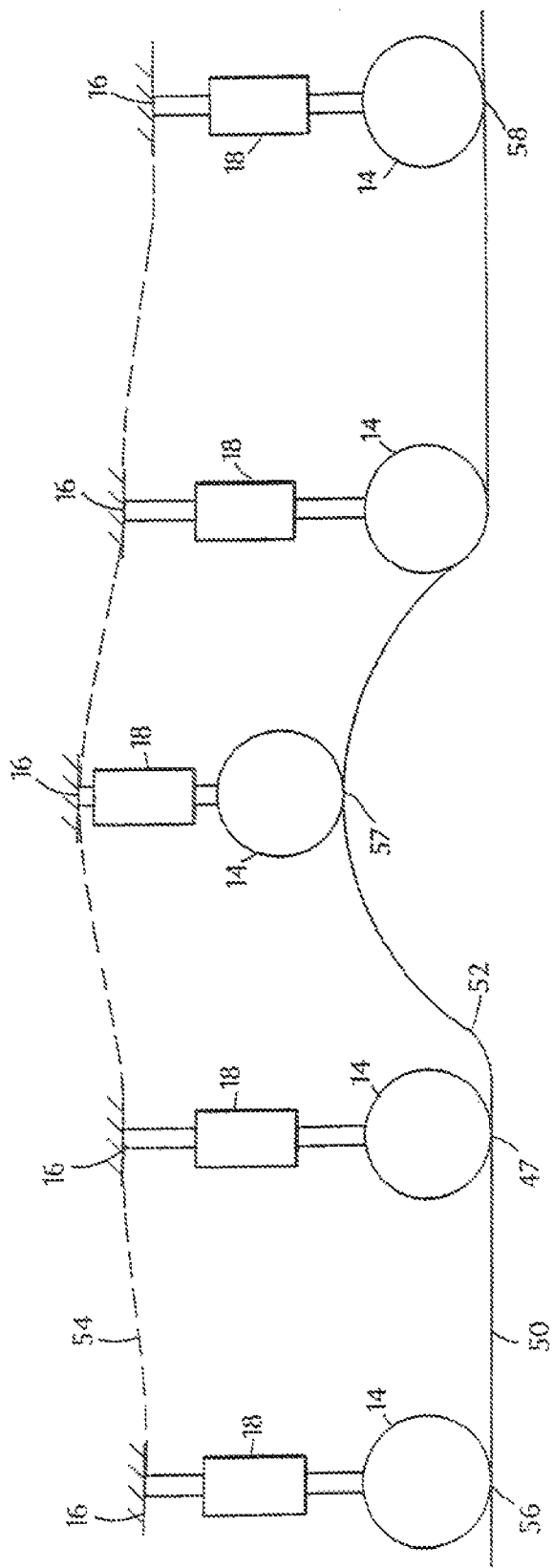
FIG. 5 is a diagrammatic view of the operation of the operation of an active suspension according to the invention.

FIG. 5 shows another example of the operation of an active suspension with a trajectory planning subsystem. Road profile 50 includes a large bump 52. Microprocessor 20 (of FIG. 2a or 2b) furnishes a computed trajectory plan 54 appropriate for road profile 50. At point 56, before wheel 14 has encountered bump 52, controllable suspension element 18 exerts a force to gradually lengthen the distance between wheel 14 and payload compartment 16. As wheel 14 travels over bump 52, the normal operation of the controllable suspension element 18 causes controllable suspension element 18 to exert a force, which shortens the distance between payload compartment 16 and wheel 14. When wheel 14 reaches the crown 57 of bump 52, controllable suspension element 18 begins to exerts a force, which lengthens the distance between payload compartment 16 and wheel 14. After wheel 14 has passed the end of bump 52, controllable suspension element 18 exerts a force shortening the distance between payload compartment 16 and wheel 14. The example of FIG. 5 illustrates the principle that the trajectory planning subsystem may cause the controllable suspension element 18 to exert a force to lengthen or shorten the distance between wheel 14 and payload compartment 16 even on a level road and further illustrates the principle that the trajectory plan may cause the controllable suspension element to react to a disturbance in the road before the disturbance is encountered.

The example of FIG. 5 illustrates several advantages of a suspension system according to the invention. By beginning to react to bump 52 before bump 52 is encountered and by continuing to react to the bump after the bump has been passed, the vertical displacement of the payload compartment is spread over a larger distance and over a longer period of time than if the suspension system reacted to bump 52 when the tire encountered bump 52. Thus, the vertical displacement, vertical velocity and vertical acceleration of payload compartment 16 are low, so passengers encounter less discomfort than with a suspension system without trajectory planning. The trajectory planning subsystem effectively provides for large bump 52, and the normal operation of the controllable suspension element is still available to handle disturbances that are not indicated in the road profile. If the road profile has sufficient resolution to only identify large perturbations such as large bump 52, or long or substantial slopes, or if the road profile is somewhat inaccurate, the active suspension element in reactionary operating mode need only react to the difference between the profile and the actual road surface. For example, if the actual profile of large bump 52 is slightly different from the stored profile on which the trajectory plan is based, the active suspension system need only provide for the difference between the actual and the stored profile of bump 52. Thus, even if the profile is imperfect, the ride experienced by the passengers in the vehicle is typically better than if the suspension lacks the trajectory planning feature.

The trajectory plan may take perceptual thresholds of vehicle occupants into account. For example, in FIG. 5, even less vertical acceleration would be encountered by the occupants of the vehicle if the trajectory plan began rising before point 56 and returned the vehicle to the equilibrium position after point 58. However, the difference in vertical acceleration may not be enough to be perceived by the vehicle occupants, so the active suspension need not react before point 56 or continue to react past point 58. Additionally, if the vehicle includes a conventional suspension spring, the force applied by the active suspension between points 56 and 47 may need to exert a force to extend the spring in addition to a force to lift the vehicle, so not beginning the rise of the trajectory plan until point 56 may consume less power than beginning the rise earlier.

Figure 6A:
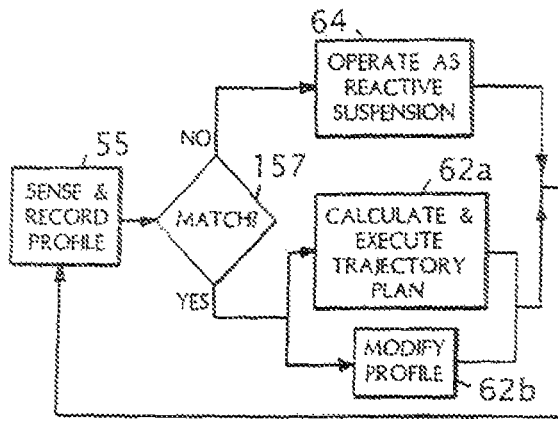
FIGS. 6a, 6b, and 6c are flow diagrams illustrating the operation of a suspension system according to the invention.

Referring now to FIG. 6a, there is shown a method for developing, executing, and modifying a trajectory plan by a system without optional locator system 24. At step 55, sensors 11, 13, 15 collect road profile information and transmit the information to microprocessor 20 which records the road profile in profile storage device 22. At step 58, the profile microprocessor compares the road profile information with road profiles that have been previously stored in profile storage device 22. The comparison may be accomplished using a pattern matching system as described below. If the road profile information matches a road profile that has previously been stored, at step 62a, the profile is retrieved, and microprocessor 20 calculates a trajectory plan appropriate for that profile. Concurrently, at step 62b, sensors 11, 13, 15 furnish signal representations of the road profile that may be used to modify, if necessary, the profile stored in profile storage device 22.

If it is determined at step 58 that there is no previously stored road profile that matches the road profile information collected in step 56, at step 64 controllable suspension element 18 acts in a reactionary mode.

Figure 6B:
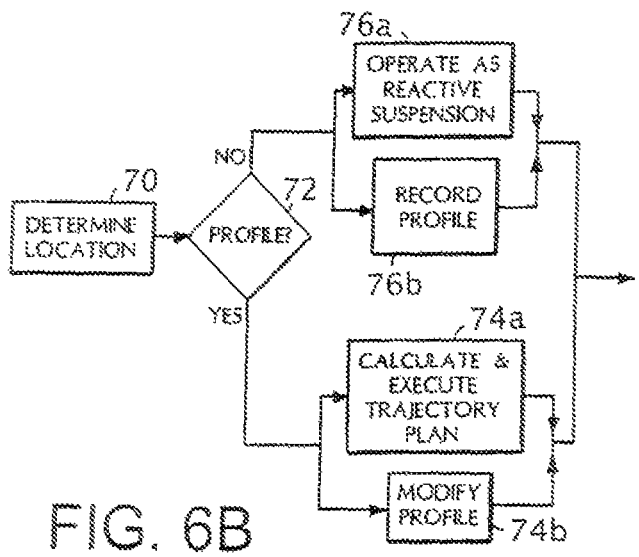

Referring now to FIG. 6b, there is shown a method for developing, modifying, and executing a trajectory plan by a system that includes optional locator system 24. At step 70, locator system 24 determines the location and direction of the vehicle. At step 72 trajectory plan microprocessor 20 examines stored profiles in profile storage device 22 to see if there is a profile associated with that location. If there is a profile associated with that location, at step 74a microprocessor 20 retrieves the profile and calculates or retrieves a trajectory plan. Depending on how the data is stored and processed, step 72 may also consider direction of travel in addition to location in determining whether there is an associated profile. Concurrently, at step 74b, sensors 11, 13, 15 provide signals representative of the road profile that may be used to modify, if necessary, the profile stored in profile storage device 22.

If it is determined at step 72 that there is no previously stored road profile associated with that location and direction, at step 76a controllable suspension 18 acts as a reactionary active suspension. Concurrently, at step 76b, sensors 11, 13, 15 furnish signals representative of the road profile, which is stored in profile storage device 22.

Figure 6C:
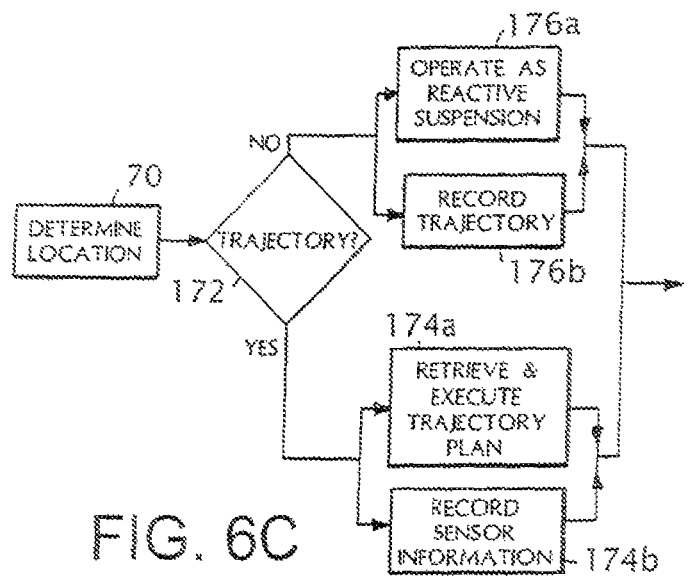

Referring now to FIG. 6c, there is shown a method for developing, modifying, and executing a trajectory plan in an embodiment of the invention as shown in FIG. 2b and having some device to locate the vehicle, such as the locator system 24, or the profile storage device 22 of FIG. 2a. At step 70, locator system 24 determines the location and direction of the vehicle. At step 172 trajectory plan microprocessor 20 examines trajectory plans in trajectory plan storage device 25 to see if there is a trajectory plan associated with that location. If there is a trajectory plan associated with that location, at step 174a microprocessor 20 retrieves the trajectory plan and transmits the information to controllable suspension element 18, which executes the trajectory plan. Depending on how the data is stored and processed, step 172 may also consider direction of travel in addition to location in determining whether there is an associated profile. Concurrently, at step 174b, signals from sensors 11, 13, 15 representative of the actual profile may be recorded so that the trajectory plan associated with the location can later be modified to provide a smoother or more comfortable ride.

If it is determined at step 172 that there is no previously stored road profile associated with that location and direction, at step 176a controllable suspension 18 acts as a reactionary active suspension. Concurrently, at step 176b, signals representative of the trajectory resulting from the reactionary operation of the controllable suspension 18 are recorded as the trajectory plan so that the stored trajectory plan can be modified to provide a smoother or more comfortable ride.

The trajectory plan may be stored in a variety of forms, as will be described below in the discussion of FIG. 8. Additionally, if the trajectory plan is calculated using characteristics (such as filter break points or window widths as will be described below), the characteristic may be stored, and the trajectory plan calculated "on the fly." This method allows the system to operate with less storage, but requires more computational power.

The methods of FIGS. 6a, 6b, and 6c illustrate one of the learning features of the invention. Each time the vehicle is driven over a portion of road, the profile or trajectory plan, or both, may be modified, so that the trajectory plan furnished by microprocessor 20 may be used to provide for a smoother ride for the occupants of the vehicle during subsequent rides over the same portion of road. Additionally, the vehicle suspension system may employ an optimization process shown below in FIG. 9.

It is desirable to determine the location of the vehicle accurately, ideally within one meter, though an active suspension with a locator system having a lesser degree of precision performs better than conventional active suspensions. One method of attaining a high degree of precision is to include in locator system 24 of FIG. 2a incorporating a high precision GPS system, such as a differential system accurate to within centimeters. Another method is to include in locator system 24 of FIG. 2a a GPS system having a lower degree of precision (such as a non-differential system accurate to within about 50 meters or some other locator system not incorporating GPS) and a supplementary pattern matching system.

One pattern matching system includes a search for a known sequence of data in a target string of data. One method of pattern matching particularly useful for data that increases and decreases from a base point includes multiplying a known sequence of n numbers by strings of corresponding length in a target string. The n products are then summed, and when the sum peaks, there is a high degree of match. Other methods of pattern matching (with other methods of determining a high degree of match) may be used.

This form of pattern matching can be usefully applied to a trajectory planning active suspension by recording a pattern of z-axis deflections from a base point and using the pattern of z-axis deflections as the search string. Pattern matching can then be used in at least two ways. In one application, the GPS system is used to get an approximate (within 30 meters) location of the vehicle, and pattern matching is then used to locate the vehicle more precisely, by using for the target string, the previously recorded pattern of z-axis deflections stored in profile storage device 22 of FIG. 2a. In a second application, pattern matching is used to compare the pattern of z-axis deflections as measured by sensors 11, 13, and 15 of FIG. 2a with patterns of z-axis deflections stored in profile storage device 22 to determine if there is a profile stored in memory.

To supplement the GPS and pattern matching system, a "dead reckoning" system may also be used. In a dead reckoning system, a vehicle change in location is estimated by keeping track of the distance the vehicle travels and the direction the vehicle travels. When the vehicle has been located precisely, the distance the vehicle travels may be tracked by counting wheel rotations, and the direction of travel may be tracked by recording the wheel angle or steering angle. A dead reckoning system is very useful if GPS readings are difficult (such as if there are nearby tall buildings) and also reduces the frequency at which GPS readings need be taken.

Referring now to FIG. 7, there is shown a diagrammatic view of an automobile and a road surface, illustrating the development of a trajectory plan. Line 80 represents the road profile as stored by profile device 22 of FIG. 2a. Line 82 represents the road profile 80 which has been bidirectionally low-pass filtered using a break frequency in the range of 1 Hz, and is used as the trajectory plan; the bidirectional filtering eliminates phase lag inaccuracies that may be present with single directional filtering. When the automobile 84 passes over the road surface represented by line 80, controllable suspension element 18 of FIG. 2a urges the payload compartment of automobile 84 to follow the trajectory plan represented by line 82. The high frequency, low amplitude disturbances in the road are easily handled by the normal operation of the active suspension. Developing of a trajectory plan by low pass filtering is very useful in dealing with the situation as described in FIGS. 3 and 4a-4c.

Processing the road profile data in the time domain to develop trajectory plans is advantageous when the velocity of the vehicle is constant; that is, each trip across the road segment is at the same velocity.

In some circumstances, processing the data in the spatial domain may be more useful than processing the data in the time domain. It may be more convenient to store data in spatial form, and processing the data in the spatial domain may make it unnecessary to transform the data to temporal form. Additionally, processing the data in the spatial domain allows the trajectory plan to be calculated including velocity as a variable; that is, the trajectory plan may vary, depending on the velocity. If the data is processed in the spatial domain, it may be advisable to perform some amount of time domain translation, for example to minimize acceleration at objectionable frequencies, such as the 0.1 Hz "seasick" frequency.

Trajectory plan development may take into account factors in addition to the spatial or time domain filtered road profile. For example, the trajectory plan may take into account large disturbances in the road as shown in FIG. 5, and discussed in the corresponding portion of the disclosure.

Figure 8:
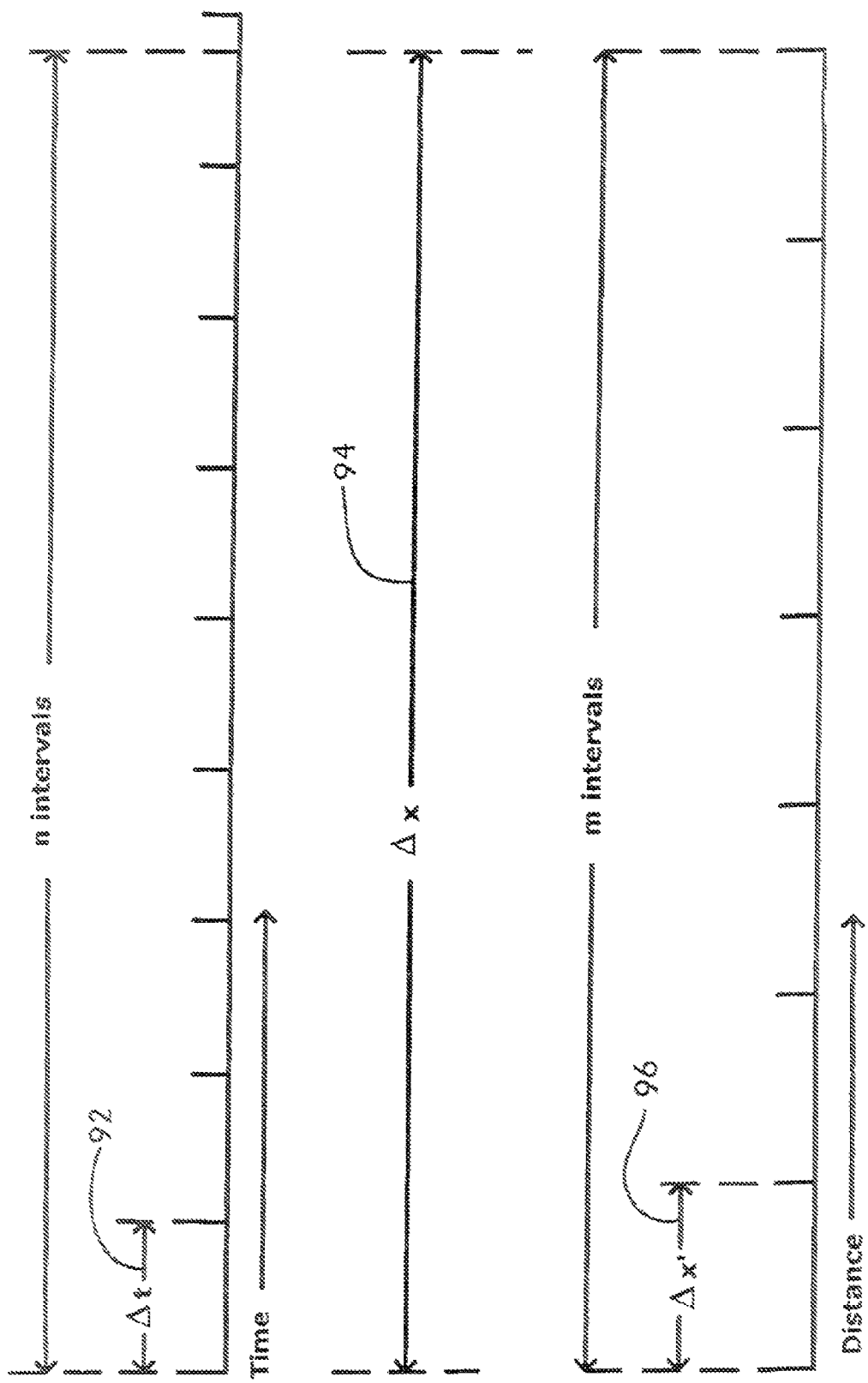
FIG. 8 is a diagram illustrating a method of collecting data in accordance with the invention.

Referring to FIG. 8, there is shown a method of collecting data points that facilitates processing the data in either the time domain or the spatial domain. FIG. 8 also shows a method of converting data from the time domain to the spatial domain. Data from sensors 11, 13, 15 are collected at time interval $\Delta t$ 92. A typical range of values for $\Delta t$ is 0.1 ms (equivalent to a 10 kHz sampling rate) to 1 ms. (equivalent to a 1 kHz sampling rate). The data points taken during the interval 94 in which the vehicle has traveled distance $\Delta x$ are combined and averaged. The averaged data is then used as data for determining a road profile and used to calculate a trajectory plan. Typical values for $\Delta x$ are four to eight inches (10.2 to 20.3 cm); $\Delta x$ intervals may be measured by sensors in the vehicle drive train, which may also provide readings for the vehicle speedometer and odometer. The number n of time intervals $\Delta t$ 92 taken during the interval in which the vehicle has traveled distance $\Delta x$ varies with the velocity of the vehicle.

In one implementation of the invention, the averaged data points are processed to determine a profile consisting of z-axis deflections relative to time (that is, a time domain representation of the profile). Since the data from sensors 11, 13, 15 may represent suspension displacement, velocity, or acceleration; the processing may include mathematical manipulation of some of the data to obtain z-axis deflections.

In another implementation of the invention, the time domain representation of the profile is converted to a spatial domain profile consisting of z-axis deflections relative to a spatial measure (such as distance traveled) or to a position in space by processing the time domain data points by the distance traveled or by the velocity from a reference location. A profile consisting of z-axis deflections relative to distance traveled can also be developed by collecting data in the spatial domain directly, at spatial intervals of $\Delta x'$ 96 (which if desired may further include averaging data points taken over larger spatial interval $\Delta x$ 94, including m intervals of distance $\Delta x'$). A road profile that is expressed in the spatial domain is independent of the velocity of the vehicle. Representing the profile in the spatial domain may be desirable if the profile is supplemented by location information determined by GPS systems, inertial navigation systems, pattern matching, or dead reckoning, or other methods using spatial terms; if there exists a database of profiles corresponding to the location, and if the corresponding profiles are expressed in spatial terms; or if the section of road is traveled over at widely varying velocities.

In still another implementation of the invention, the profile may be recorded as a series of data points representing states of the vehicle, which are measured by sensors 11, 13, and 15. In this implementation, data from some or all of the sensors 11, 13, 15 are stored in their native dimensions (that is, forces, accelerations and velocities are stored, respectively, as forces, accelerations and velocities, and are not converted to other units of measure, such as vertical deflection). The data may be averaged over time or distance, as described above. This implementation is especially useful for use with pattern matching systems, which are described above. For road profiles recorded in this implementation, pattern matching is performed by comparing the state of the vehicle as measured by sensors 11, 13, and 15 with recorded profiles (expressed as vehicle states) to determine the degree of match. Recording the profile as a series of data points also lends itself to including in the profile data, in addition to states of the vehicle measured by sensors 11, 13, and 15, additional data. Additional data may include lateral acceleration, velocity, or suspension displacement, compass heading, steering angle, or other data such as may be included in commercially available navigation systems. The additional data may be used to provide more precise pattern matching.

One method of developing a trajectory plan is to smooth the data representing the profile in a manner that provides positive and negative values. One method of smoothing is to low pass filter, preferably bi-directionally, the profile data. If the profile is expressed in spatial terms, the filter is a spatial filter; in one implementation the spatial filter is a real low-pass filter having a fixed break point on the order of 15 to 30 feet (4.6 to 9.1 meters). If the profile is expressed as temporal data, filtering can be accomplished in either the time or frequency domains (temporal data can be transformed to the frequency domain through use of a Fourier transform). In other implementations, the filters could be real or complex filters of various orders or dimensions. The trajectory plan can be developed using multiple passes in each direction of the filter. While low-pass filtering of the temporal or spatial data is one method of developing a trajectory plan, other methods of smoothing profile data may be used to develop a trajectory plan. Other forms of data smoothing include anti-causal and non-linear filtering, averaging, windowed averaging, and others.

As stated above, the data is expressed in positive and negative terms, for example a bump may be treated as a positive value and a depression (or "pothole") treated as a negative value. The data smoothing maintains positive and negative values. Maintaining positive and negative values in the data enables the trajectory plan to urge the controllable suspension element to apply a force in either direction, for example, to shorten the distance between the wheel and the passenger compartment in the case of a bump and to lengthen the distance between the wheel and the passenger compartment in the case of a depression. Maintaining positive and negative data values is not required for active suspension systems that modify controller parameters such as gain, and therefore expressing the data in a form that is always positive, such as root-mean-square, is sufficient. Active suspension systems that control gain control how the suspension will exert a force to shorten or lengthen the distance between the wheel and the passenger compartment responsive to a road disturbance only when the road disturbance is encountered; whether the disturbance is positive or negative can be determined when the disturbance is encountered. An active suspension system according to the invention exerts a force to lengthen or shorten the distance between the wheel and the passenger compartment before the disturbance is encountered; therefore it is desirable that data for a suspension system according to the invention retain positive and negative values.

A filter used to develop the trajectory plan may have either a fixed break point or a variable break point. For example, it may be advantageous to use a filter of greater length (in the spatial or time domains or lower frequency in the frequency domain) for a long, flat section of road than for an undulating section of road.

Figure 9:
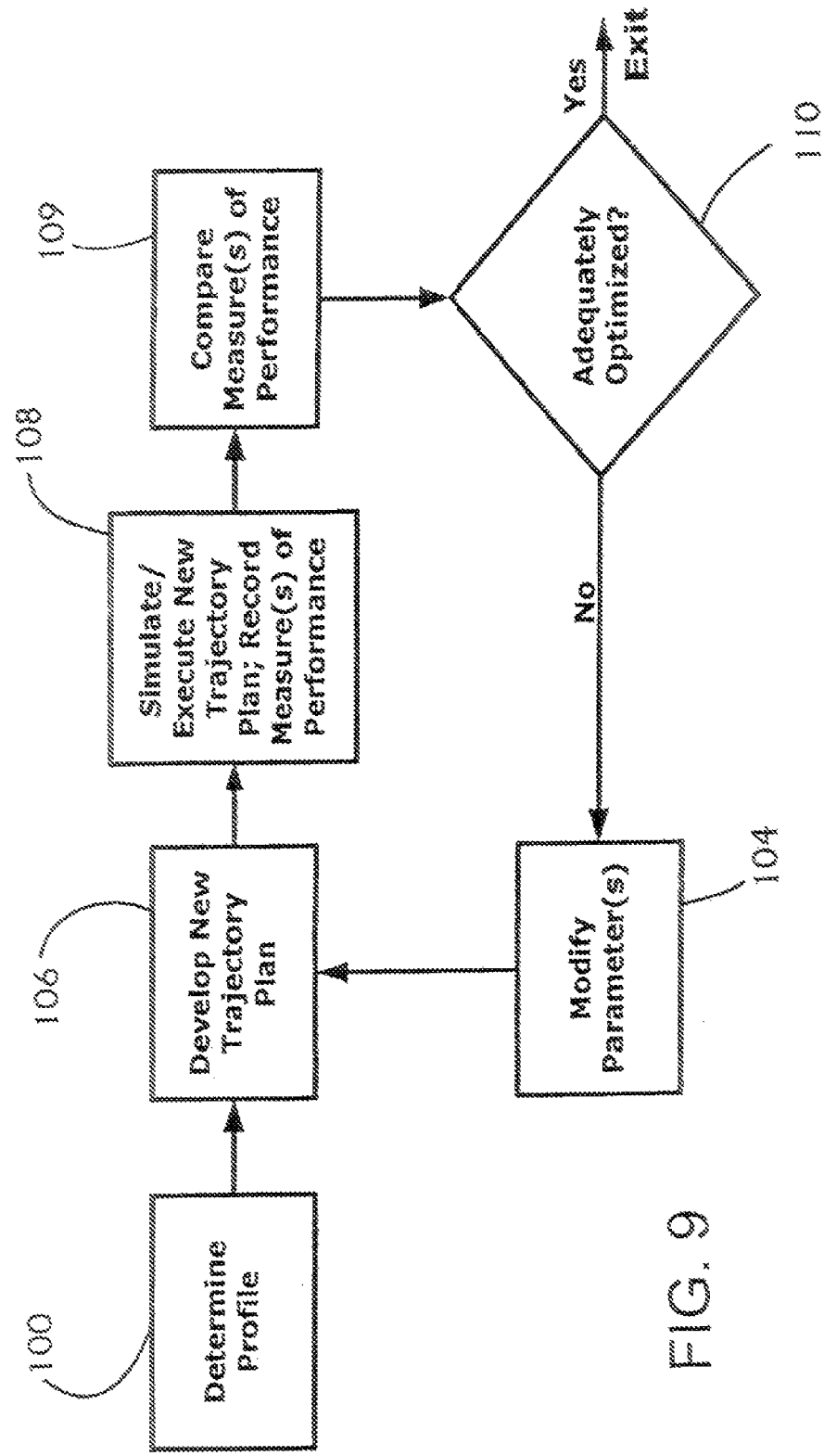
FIG. 9 is a block diagram of a process for optimizing a trajectory plan.

FIG. 9 shows a method for optimizing a trajectory plan. At step 100, a profile is determined, either by passing over the road, or by retrieving a profile from a database. At step 106, a trajectory plan is developed. At step 108, there is a simulated or actual execution of the new trajectory plan, and some measure (or combination of measures) of performance (such as suspension displacement, power consumption, traction, vertical velocity, or vertical acceleration of the payload compartment) recorded from the execution of the new trajectory plan. At step 109, the measure(s) of performance is compared with the measures of any previous trajectory plans that may have been calculated for that profile, and the characteristic corresponding with the better performance according to the performance measures is retained. Of course depending on the performance measure, "better performance" may be either a higher or lower value of the performance measure. For convenience, in this specification, it will be assumed that the performance measure is measure (for example of power consumption, vertical velocity, vertical acceleration) in which a lower value is "better performance." At optional step 110, it may be determined if an adequately optimized condition exists. If an adequately optimized condition exists, the optimization process is exited. If an adequately optimized condition does not exist, one or more of the characteristics used to develop the trajectory plan is modified at step 104. Steps 106, 108, 109, and optional 110 may then be repeated until an optimized condition exists or until some other event (such as varying the characteristic value over the entire range of values or over a pre-determined range of values) occurs.

The specific trajectory plan characteristic value or values that can be modified depends on the method that was used to develop the trajectory plan. For example, if the trajectory plan was developed by low pass filtering the profile data, the break point of the filter may be the characteristic value that is modified; if the trajectory plan was developed using windowed averaging, the size of the window may be the characteristic value that is modified.

In one implementation of the invention, the trajectory plans are developed by smoothing the profile data, using a low pass filter. The first trajectory plan may be developed using an initial seed value for the break frequency of the low pass filter. The initial seed value may be selected based on the smoothness of the road, using a longer (or lower frequency) break point if the road is smooth, and a shorter (or higher frequency) break point if the road is rough. Subsequent trajectory plans are developed using filters having different break points (in either the spatial or temporal domains). An adequately optimized condition may exist if neither an increase nor a decrease of the filter break point results in a better measure or measures of performance or if some pre-determined threshold of performance is reached.

The process described above is consistent with the concept of finding a local maximum in system performance. Known optimization techniques can be applied that may allow the system to find a global performance maximum. For example, if only a single characteristic is varied, the characteristic may be varied over the entire range of possible values for the characteristic and performance calculated for each value. Alternatively, more sophisticated gradient-based search algorithms can be applied to improve the speed with which an optimum condition can be found. Gradient based methods can also be used to find optimum performance (local or global) when more than one characteristic at a time is allowed to vary.

The process of FIG. 9 may be modified in a number of ways. The length of road section to which the process of FIG. 9 is applied may be varied. The process of FIG. 9 may be executed by a computer remote from the vehicle and downloaded to the vehicle. The process of FIG. 9 may be executed by a microprocessor onboard the vehicle. A single characteristic may be varied over a limited range of values and the characteristic corresponding to the best measure of performance retained. The process may be performed when the computational capacity of the vehicle is not being used, such as when the vehicle is parked. Executions of the trajectory plan may be either actual passes of the vehicle over the stretch of road, or may be simulated, at a convenient time, such as when the car is parked or not moving.

As stated previously, a trajectory plan is a pre-determined path in space of a point or set of points on the payload compartment. The trajectory plan may be stored in spatial terms, or may be stored as a succession of forces to be applied by controllable suspension element 18 between payload compartment 16 and wheel 14 to cause a point, such as a point in the passenger compartment, to follow the trajectory prescribed by the trajectory plan. The trajectory plan may also be stored as a succession of vehicle states that would be measured by sensors 11, 13, 15 if the trajectory plan were executed, or as a set of commands to the controllable suspension.

Calculating and storing the trajectory plan in terms of force applied or in terms of vehicle states simplifies the calculation of the trajectory plan by eliminating mathematical manipulation of data to get the data in the proper unit of measure. For example, if the trajectory plan is expressed in terms of forces to be applied by the controllable suspension, the profile data can be low-pass filtered to obtain a trajectory plan that is also expressed in terms of forces to be applied by the controllable suspension. The need for converting the data from force to acceleration to velocity to displacement is eliminated.

FIGS. 3, 4a-4c, and 5 and the corresponding portions of the disclosure illustrated the principle that the execution of the trajectory planning subsystem may affect the normal reactionary operation of an active suspension. In FIG. 3, a normal reactionary operation of the suspension element may cause the vehicle to "nose in" to a hill. In FIGS. 4a-4c, the controllable suspension using a trajectory plan causes the vehicle to follow a pre-determined path in space (that is, the trajectory plan) and pitch, rather than "nosing in" to a hill. The trajectory plan may cause the controllable suspension to exert no force even if there is a road disturbance. The trajectory plan may cause the controllable suspension to exert a force related to a road disturbance before encountering the disturbance. The trajectory plan may cause the controllable suspension to continue to exert a force related to a road disturbance even after the disturbance has been traversed.

Figure 10A:
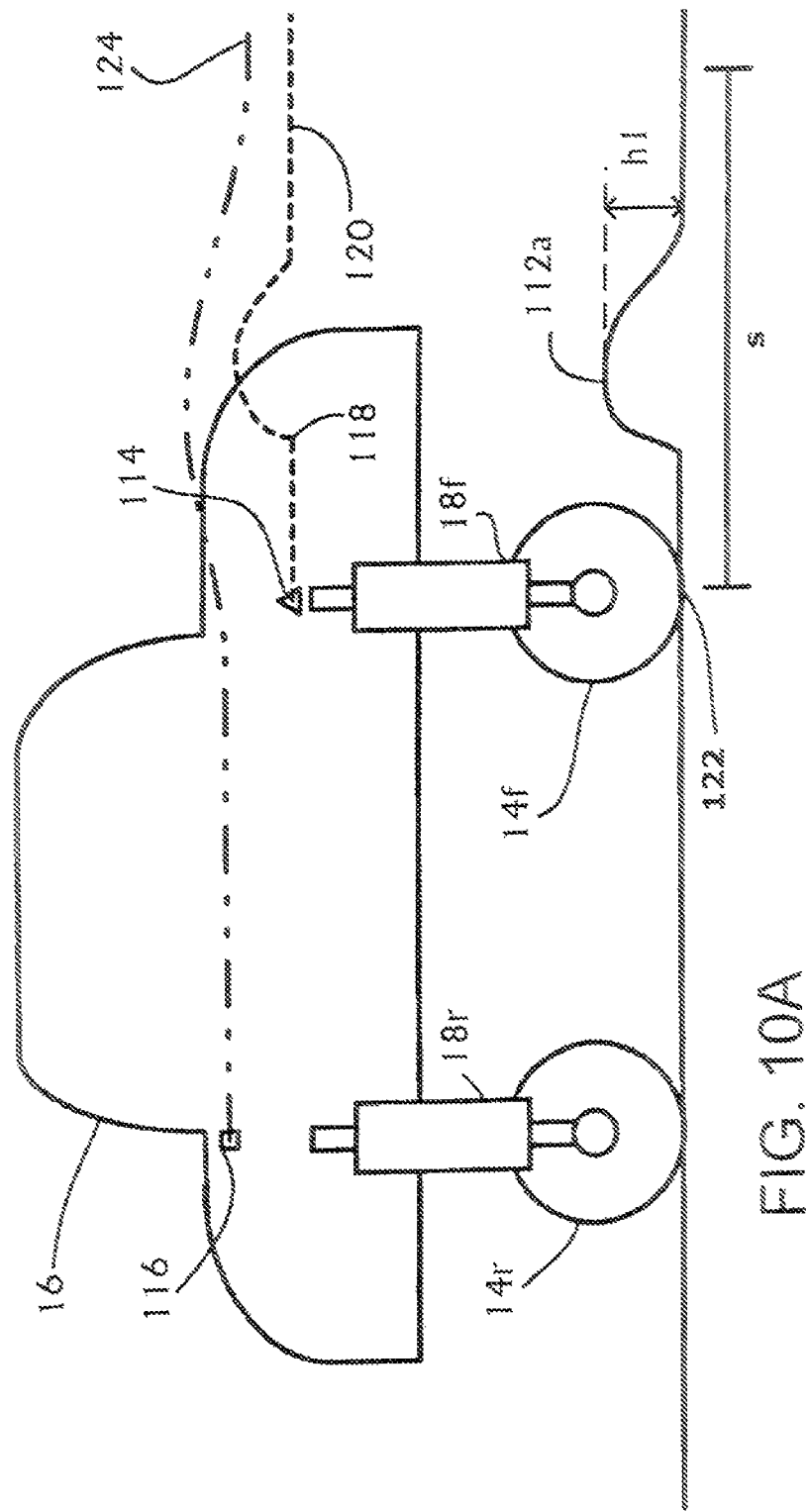
FIGS. 10A, 10B and 10C are diagrams of a vehicle operating on a road surface in accordance with the invention.
Figure 10B:
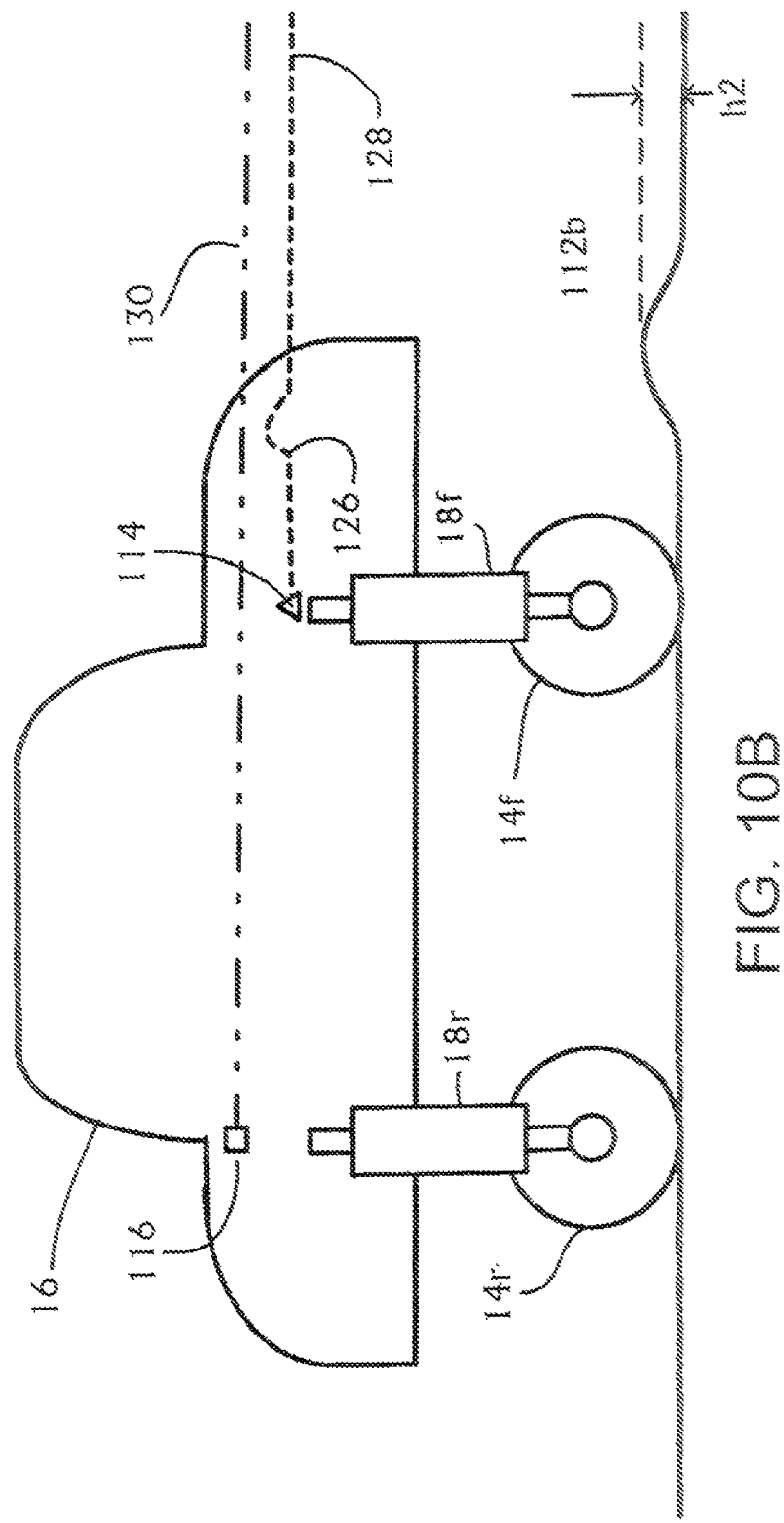
Figure 10C:
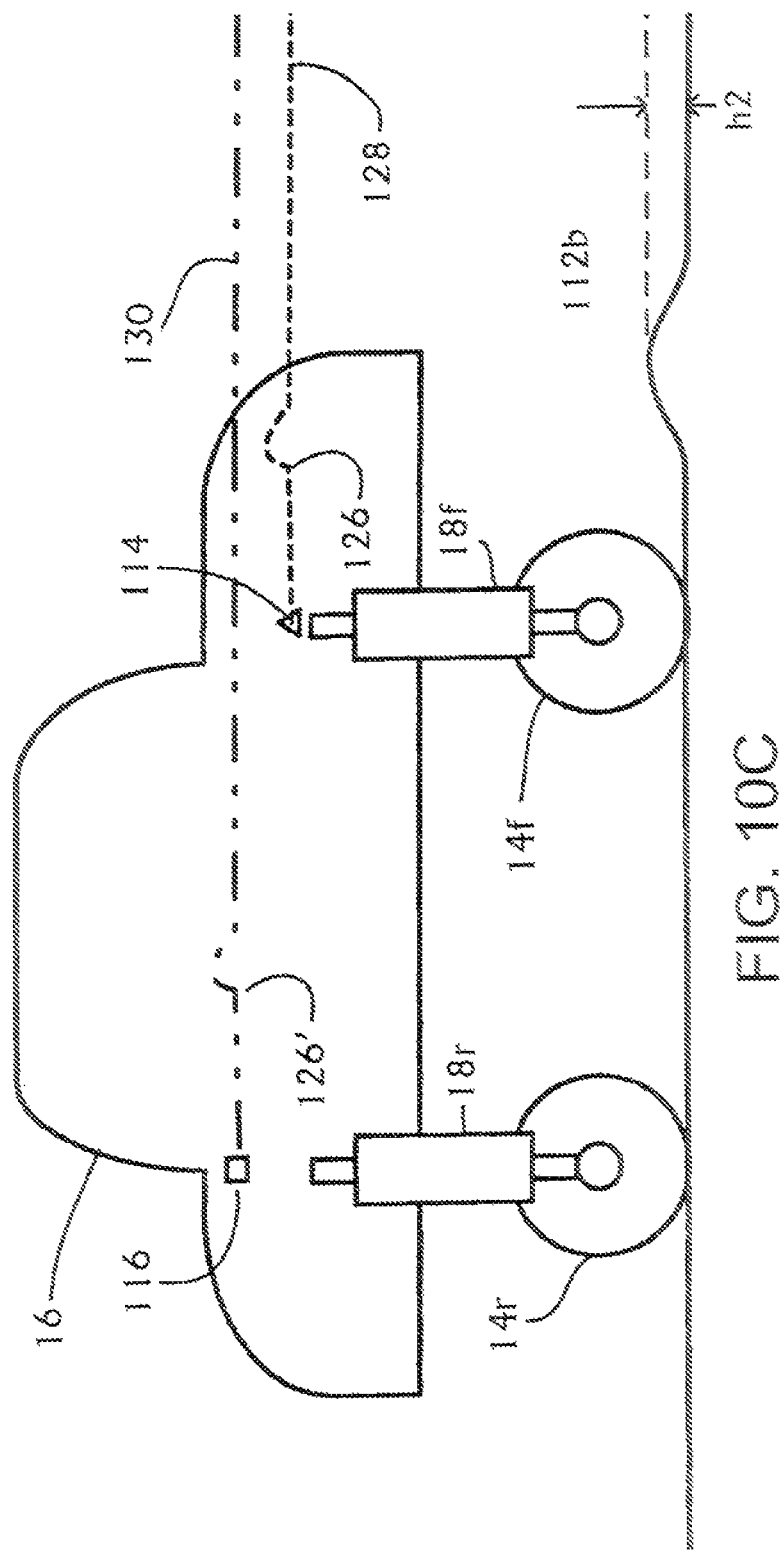

FIGS. 10a-10c each show diagrammatic views of a vehicle and a road surface, illustrating the application of the invention to the front and rear wheels. The "front to rear" feature is especially useful when a vehicle is traversing a portion of road for the first time, and for which no road profile is available. The vehicles of FIGS. 10a and 10b use information from sensors associated with a front wheel to develop a trajectory plan for the rear wheel. This feature of the invention is illustrated by showing the trajectory of a point 114 in the passenger compartment above a front wheel 14f, and the trajectory of a point 116 in the passenger compartment above a rear wheel 14r. Front and rear wheels 14f and 14r are mechanically coupled to payload compartment 16 by corresponding controllable suspension elements 18f and 18r, respectively. The vehicle is operating on a road that has a disturbance 112a that has a height h1, which is greater than the available suspension stroke with the suspension in a centered position, and which is smaller than total combined suspension stroke (that is the combined available upwards and downwards suspension travel with the suspension element in a centered position). When front wheel 14f encounters disturbance 112a, the suspension reacts to keep the trajectory of point 114 flat. As the suspension bottoms out, or approaches bottoming out, for example at point 118, the upward force caused by the road disturbance is transferred to point 114, so that point 114 follows a path 120. As described above, many suspension systems have centering systems for preventing the suspension from bottoming out and for maintaining available suspension stroke; the action of these systems also results in an upward acceleration of point 114 and a path similar to path 120

As the front wheel travels the section s of the road, the microprocessor may record the profile of the road and smooth the profile data to provide a trajectory plan for execution by the rear wheel controllable suspension element 18r. When the rear wheel approaches the beginning of section s at point 122, prior to engaging disturbance 112a, controllable suspension element 18r exerts a force to lengthen the distance between wheel 14r and passenger compartment 16, urging point 116 gradually upward. When wheel 14f engages disturbance 112a, the normal reactionary mode action of the controllable suspension element 18r is to exert a force to cause point 116 to follow the trajectory plan 124. Since the controllable suspension element has lengthened the distance between the wheel and the passenger compartment, more suspension stroke is available, and the controllable suspension element can absorb disturbance 112a without reaching or approaching a bottomed out situation. A trajectory such as trajectory 124 is more comfortable for passengers in the vehicle because it avoids rapid vertical accelerations and velocities.

Another feature of the invention is illustrated in FIG. 10b. A vehicle similar to the vehicle of FIG. 10a has a centering system for maintaining available suspension stroke and preventing the suspension element from bottoming out. If the suspension element approaches a bottomed out or topped out condition, the centering system urges the suspension element system toward a centered position, which preserves suspension travel but allows some vertical acceleration of the passenger compartment. Road disturbance 112b has a height h2 that is slightly less than the available suspension stroke with the suspension element in a centered position. When front wheel 14f engages disturbance 112b, the controllable suspension element 18f acts to keep the passenger compartment level and to prevent vertical acceleration of the passenger compartment. As the suspension element approaches a bottomed out condition, for example at point 126, the centering system acts to prevent the suspension element from bottoming out by allowing some vertical movement of the passenger compartment as indicated at point 126 of path 128. As the front wheel traverses disturbance 112b, the sensors record the height h2 of the disturbance. Since the height of the disturbance 112b is less than the available suspension travel, the controllable suspension disables the centering system for the rear wheel. When the rear wheel 14r traverses the disturbance 112b, there is no vertical movement of the passenger compartment, as indicated by path 130.

A variation of the example of FIG. 10b is shown in FIG. 10c. In the example of FIG. 10c, when the passenger compartment begins to move vertically when the front wheel is at point 126 and rear wheel is at point 126', the rear control suspension element exerts a force so that the path of 130 of rear point 116 follows the same trajectory as the front point 114. This lessens the amount of pitch experienced by the passengers. When the rear wheel encounters disturbance 112b, the rear suspension element may operate as in FIG. 10b.

Referring to FIGS. 11a and 11b, there is shown another feature of the invention. In FIG. 11a, when the front wheel 14f encounters the beginning 136 of long upslope 138 on a road for which the controllable suspension element does not have a profile, front controllable suspension element 18f acts to keep the passenger compartment level. The leveling action of the front controllable suspension element continues until point 132 in which the front controllable suspension element 18f is "nosed in" and approaches bottoming out as discussed above in the discussion of FIG. 3. When the front controllable suspension element reaches or approaches a bottomed out condition, a centering subsystem urges the front controllable suspension element 18f toward a centered position, at, for example, point 134. In the interval between points 132 and 134, the occupants of the vehicle, particularly the front seat passengers experience a "nosed in" sensation, and experience the upward acceleration after the wheel has encountered the hill, that is after they expect it. This can be disconcerting to the occupants. Additionally the passengers experience vertical acceleration that is greater than the passengers would have experienced if the front suspension element had remained in a centered position and not acted to keep the car level. The vertical acceleration, suspension displacement, and other measurements are recorded by the microprocessor, which then develops a response for the rear suspension element.

In FIG. 11b, when rear wheel 14r encounters the beginning 136 of long upslope 138, the microprocessor issues a command to the rear suspension element to remain in a centered position and not to react to the upslope. The result is that the rear point 116 follows a path that is similar to the upslope of the road, and which causes the occupants of the vehicle, especially the occupants of the back seat, to experience less vertical acceleration and velocity when the rear wheel encounters the upslope than when the front wheel encounters the upslope. Additionally, they experience the amount of upward acceleration that they expect, and experienced the upward acceleration when they expect it.

The example of FIGS. 11a and 11b illustrates the feature that a controllable suspension according to the invention may react to some road stimuli less than a conventional reactive suspension. In an actual implementation, the operational example of FIG. 11b may be combined with the operational example of FIG. 10a to lessen the upward acceleration at point 136 of FIG. 11a-11b so that the actual trajectory spread the a upward acceleration over a longer vertical distance, such as in trajectory 130a of FIG. 11c.

Vehicle suspension systems not using information from a front suspension element to affect the operation of a rear wheel suspension element cannot perform the ride-improving actions shown in FIGS. 10a, 10b, and 11b. Vehicle suspensions that use information from a front suspension element to change characteristics of a control system of a rear suspension element cannot cause the rear suspension element to apply a force before a disturbance is encountered.

There has been described novel apparatus and techniques for vertical trajectory planning. It is evident that those skilled in the art may now make numerous modifications and uses of and departures from the specified apparatus and techniques disclosed herein. Consequently, the invention is to be construed as embracing each and every novel feature and novel combination of features present in or possessed by the apparatus and techniques disclosed herein and limited only by the spirit and scope of the appended claims.

What is claimed is:

1. A method for improving accuracy of vehicle position determination, comprising:
   determining an initial vehicle position estimate based on GPS data,
   recording a sequence of sensor data from a sensor located with the vehicle, and
   refining the initial vehicle position estimate by performing pattern matching with a pattern matching system that looks for the presence of a known sequence of data in the recorded sequence of sensor data
      wherein the pattern matching system multiplies a sequence consisting of n numbers obtained from the known sequence of data by a corresponding sequence of n numbers obtained from the recorded sequence of sensor data, sums the results of the n multiplications, and determines when the sequences match by identifying when the sum of the n multiplications has a peak.

2. The method for improving accuracy of claim 1 wherein the sensor data is Z axis deflection data.

3. The method for improving accuracy of claim 1 further comprising using a dead reckoning system to provide additional information on vehicle speed and direction when GPS data is difficult to obtain.

4. The method for improving accuracy of claim 3 wherein the dead reckoning system counts wheel rotations of the vehicle.

5. The method for improving accuracy of claim 3 wherein the dead reckoning system tracks steering angle changes of the vehicle.

6. The method for improving accuracy of claim 1 wherein the pattern matching system performs continuous pattern matching.

7. The method for improving accuracy of claim 1 wherein the pattern matching system matches consecutive groups of n multiplications.

8. The method for improving accuracy of claim 1 wherein the known sequence of data and the recorded sequence of data are transformed into the spatial domain prior to performing the pattern matching by the pattern matching system.

* * * * *